US006782306B2

(12) United States Patent
Yutkowitz

(10) Patent No.: US 6,782,306 B2
(45) Date of Patent: Aug. 24, 2004

(54) MOTION CONTROL SYSTEM AND METHOD UTILIZING SPLINE INTERPOLATION

(75) Inventor: Stephen J. Yutkowitz, West Chester, OH (US)

(73) Assignee: Siemens Energy & Automation, Alpharetta, GA (US)

( * ) Notice: Subject to any disclaimer, the term of this patent is extended or adjusted under 35 U.S.C. 154(b) by 487 days.

(21) Appl. No.: 09/733,448

(22) Filed: Dec. 8, 2000

(65) Prior Publication Data

US 2003/0033050 A1 Feb. 13, 2003

Related U.S. Application Data

(60) Provisional application No. 60/171,144, filed on Dec. 16, 1999.

(51) Int. Cl.[7] .............................................. G06F 19/00

(52) U.S. Cl. ....................... 700/189; 700/159; 700/182; 700/184; 700/187; 700/188; 700/186

(58) Field of Search ................................ 700/189, 188, 700/187, 186, 184, 182, 159

(56) References Cited

U.S. PATENT DOCUMENTS

| 3,727,191 A | * | 4/1973 | McGee ........................ 700/189 |
| 4,506,335 A | * | 3/1985 | Magnuson .................... 700/189 |
| 5,508,596 A | * | 4/1996 | Olsen ........................... 700/174 |
| 5,510,996 A | * | 4/1996 | Kuhn et al. .................. 700/189 |
| 5,532,932 A | * | 7/1996 | Niwa ........................... 700/189 |
| 5,732,107 A | * | 3/1998 | Phillips et al. .............. 375/296 |
| 5,936,864 A | * | 8/1999 | Otsuki et al. ................ 700/188 |

* cited by examiner

*Primary Examiner*—Albert W. Paladini
*Assistant Examiner*—Charles Kasenge

(57) ABSTRACT

A spline interpolation motion control system and method that can automatically determine where sharp corners and flat sections were intended in a part program. In one embodiment, based upon the length ratio of two consecutive spans, the system and method determines whether to interpolate the first span with a line or with a spline function. If a parameter range is not met, then the span is interpolated as a line to maintain the intended flat section in the program. Also, in this embodiment, the angle defined by a pair of consecutive spans is used to determine whether the two spans should be interpolated with lines or with splines. If a tolerance is exceeded, then the spans are interpolated linearly to maintain the intended sharp corner in the part program.

34 Claims, 13 Drawing Sheets

OPTIMAL PARABOLIC

CURRENT SPAN IS "INTERIOR" SPLINE

CURRENT SPAN IS 'FROM STOP' SPLINE

CURRENT SPAN IS 'TO STOP' SPLINE

CURRENT SPAN IS 'FROM LINE' SPLINE

CURRENT SPAN IS 'FROM CIRCLE' SPLINE

CURRENT SPAN IS 'TO LINE' SPLINE

CURRENT SPAN IS 'TO CIRCLE' SPLINE

CURRENT SPAN IS 'BETWEEN' SPLINE TYPE

MOTION CONTROL SYSTEM AND METHOD UTILIZING SPLINE INTERPOLATION

This application claims the benefit of U.S. Provisional Application No. 60/171,144, filed on Dec. 16, 1999.

TECHNICAL FIELD

The present invention relates generally to motion control systems and methods in which a series of programmed points are provided, and smooth movement is accomplished between these points using spline interpolation, such as a third or higher order polynomial function for example. In particular, the present invention relates to a motion control system and method which automatically determines when a smooth curve in a series of points was intended, and only interpolates with splines when such a curve is intended. Moreover, the invention relates to a motion control system and method for smoothly moving through a series of programmed points by using only the programmed information and without requiring additional data from the user, so that the system and method can be used with existing part programs.

BACKGROUND OF THE INVENTION

Computer controlled positioning systems, such as machine tool systems or robotic mechanisms for example, typically include one or more movable members, such as a spindle carrier for example, which are movable along one or more motion axes. In response to a set of programmed control points which define a desired motion path, a computer or other controller generates position commands causing the axes that drive the movable members to be moved in a coordinated fashion along an actual motion path, which is intended to replicate the desired path. In such systems, the points along the path are typically inserted in a program along with a command defining how the points are to be traversed. For example, with respect to the machine tool context, a "part program" can be constructed utilizing datapoints along the path in three dimensional space, and "G-codes" which determine how the points are to be traversed (e.g., linearly or circular or helical). The command and the points that follow it are referred to as a "block" in the program. Linear paths are typically programmed by defining the end points along the line, and circular paths are typically programmed by defining the circle segment endpoints and circle center. Motion along the path can be achieved by interpolating intermediate position commands along the path between the programmed points at a predetermined repetition rate, and motion of the movable members can be controlled in response to these intermediate "interpolated" position commands.

Previously, to approximate non-circular curved paths, a large number of points along the path were programmed, and the path was interpolated linearly, so as to create a series of short line segments. However, reproduction of a desired smooth contour with a series of short line segments can result in a program which consumes large amounts of memory, and the velocity in which the curved span is traversed can be limited by the controller's processing capability. Moreover, such programming results in instantaneous changes in direction at the transitions between the short segments, causing step changes in axis velocity, which, in machine tool applications, can result in reduced quality of surface finish, accuracy errors on the finished workpiece, undesirable machine vibrations, and/or jerky motion. Accordingly, a method and apparatus for smoothly moving through paths having contoured portions with accuracy and without vibrations is desired. Additionally, a curve composed of many small linear segments does not contain any information to the control about the average curvature and the control is unable to precisely limit the feedrate of the curve as is normally required to prevent axis accelerations from being exceeded.

Methods have been developed which allow a programmer or computer aided manufacturing system (CAM) to supply parametric information to describe the desired curve or contour as a function of time. While such methods allow the desired curve to be traversed without approximation calculations by the controller, such approaches require additional information to be supplied by the programmer or the CAM, other than simply the programmed endpoints.

In addition, spline interpolation methods have been developed for connecting programmed points with one or more smooth curves, or splines. However, such methods can not accurately predict the path that was desired by the user solely from the endpoints that are programmed. For example, such methods provide no capability of automatically distinguishing between a series of points that were intended to define a sharp corner and a series of points that were intended to define a smooth contour through the points. Thus, the path actually achieved may differ significantly from the desired path.

Moreover, many such spline interpolation methods require additional points from the user in order to define a path that is to be interpolated using splines. Thus, an existing part program, such as those that define contoured sections by a plurality of short spans, cannot be utilized with such a method without additional parameters being provided.

Accordingly, it is desirable to provide a spline interpolation motion control system and method which can accurately and automatically distinguish between contoured paths, linear paths, and sharp corners in a part program, and to use spline interpolation only for the contoured paths. It is also desirable to make such decisions solely from programmed endpoints and without additional parameters from the user. In addition, it is desirable to provide such a system and method which can smoothly connect the various flat, contoured, and cornered segments with minimal step changes in velocity. Moreover, it is desirable to provide a spline interpolation system and method which can be used with conventional part programs, which were written for non-spline control systems, with minimal changes to the part program. In addition, it is desirable to provide a spline interpolation motion control system and method which provides the ability to apply consistent velocity constraints to the controlled motion based upon path curvature, to thereby more accurately control the motion. Furthermore, it is desirable to provide such a system and method which allows for precise control of path speed and acceleration.

SUMMARY OF THE INVENTION

It is an object of the present invention to obviate the above-described problems.

It is another object of the present invention to provide a system and method for controlling a machine tool that can provide machined parts of high quality and minimal wear on the machine.

An additional object of the present invention is to provide a motion control system and method that can accurately and automatically determine an intended path from points along the path. To achieve one or more of these objects, a method of controlling motion of a set of axes to provide desired motion of movable machine member or members is provided. The method comprises receiving a plurality of points that define a desired path for the movable member, the plurality of points defining a plurality of spans on the desired path. The method also comprises calculating a length of each span in the plurality of spans, and at each span, determining the relative length of a first span with respect to at least one other adjacent span in the plurality of spans. Based upon the relative length, it is decided whether the span should be interpolated using a spline function and whether the adjacent span should be interpolated using a spline function. If the first span should be interpolated using a spline function, the method derives a spline interpolation equation for the first span, wherein the spline interpolation equation comprises a polynomial of at least the third order. A movable member is then moved according to the spline interpolation function.

According to another aspect of the invention, a method of controlling motion of a movable machine member. The method comprises receiving a plurality of points that define a desired path for the movable member, the plurality of points defining a plurality of spans on the desired path. The method also comprises determining a change in direction between each pair of adjacent spans. A first span and a second span in the plurality of spans comprise an adjacent pair, and the change in direction is compared to an angle threshold. (The first and second spans are consecutive spans.) Based upon the comparison, it is decided whether the first span should be interpolated using a spline function and whether the second span should be interpolated using a spline function. If the first span should be interpolated using a spline function, a spline interpolation equation is derived for the first span, wherein the spline interpolation equation comprises a polynomial of at least the third order. The movable member is then moved according to the spline interpolation equation.

A method of controlling motion of a movable machine member is also provided according to one aspect of the invention. The method comprises providing a program having a plurality of points that define a plurality of spans on a desired path for the movable member. The program contains no spline interpolation commands, and the program commands a curved section by a series of short spans. The method also comprises indicating that the curved section of the program should be interpolated using splines, without providing any additional points on the desired path. In addition, it is determined where the curved section is located in the program. Using the points in the program, a spline interpolation equation is calculated for the curved section, and the movable member is moved according to the spline interpolation equation.

According to another aspect, a method of controlling motion of a movable machine member is provided. The method comprises receiving a plurality of points that define a desired path for the movable member, the plurality of points defining a plurality of spans on the desired path. Then, it is decided whether a current span in the program should be interpolated using a spline interpolation function. If the current span is to be interpolated using a spline interpolation function, a spline type is selected for the current span from a plurality of spline types based upon characteristics of spans adjacent to the current span. Based upon the spline type, constraints are determined for the spline interpolation function. The constraints determine the transition between the previous span and the current span and the transition between the current span and the next span. Using the constraints, a spline interpolation equation is determined for the current span. The movable member is moved according to the spline interpolation equation.

A system for controlling the motion of a movable member is also provided. The system comprises a movable member, a number of actuators coupled to the movable member to cause non-linear movement of the member, and a memory unit containing a plurality of points which define a desired path for the movable member, the plurality of points defining a plurality of spans on the desired path. The system also includes a spline function calculator in communication with the memory unit. The spline function calculator is configured to choose which of the plurality of spans should be interpolated using a spline function based upon the length of the spans and to calculate a spline interpolation function for the chosen spans. A position command interpolator is also provided which is in communication with the spline function calculator and configured to interpolate position commands from the spline interpolation function for control of the actuator.

Still other objects of the present invention will become apparent to those skilled in this art from the following description wherein there is shown and described exemplary embodiments of this invention, including a best mode currently contemplated for carrying out the invention, simply for the purposes of illustration. As will be realized, the invention is capable of other different aspects and embodiments without departing from the scope of the invention. Accordingly, the drawings and descriptions are illustrative in nature and not restrictive in nature.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION OF EXEMPLARY EMBODIMENTS

Figure 1:
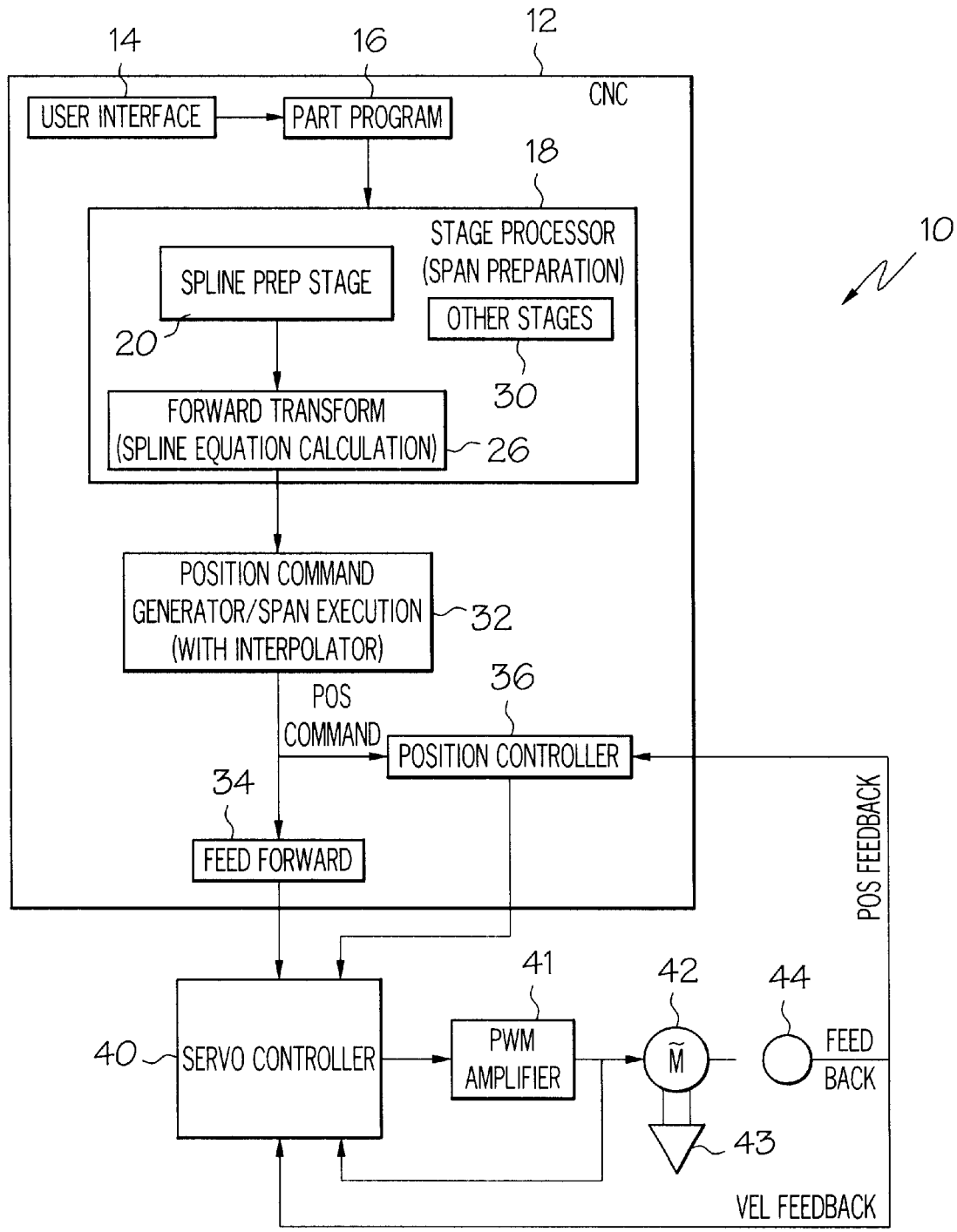
FIG. 1 is a block diagram illustrating generally a machine tool system having a computer numerical control with spline interpolation capability, according to one embodiment of the present invention.

FIG. 1 is a block diagram illustrating generally a machine tool system 10 having a computer numerical control (CNC) 12 with spline interpolation capability, according to one embodiment of the present invention. The CNC 12 includes a user interface 14 which is used to generate or load a part program 16 for commanding movement of a tool 43 relative to a work piece (not shown). For example, the user interface 14 could allow the user to input command data, known as G-codes, into the part program 16. G-codes typically include the alphabetic character G, a numerical value following the character G to indicate the type of motion desired, and additional data needed for the motion, such as points along the desired path. Accordingly, the points provided in these codes in the part program 16 define a number of consecutive spans along the desired motion path.

The part program 16 is then received by a stage processor 18 which extracts the datapoints that define the commanded motion path, and saves this data into variables which represent various spans along the path. In addition, the stage processor 18 includes a spline preparation stage 20 which, according to principles of the present invention, determines where in the commanded motion path it is desirable to use spline interpolation or linear interpolation, based upon the length of the various spans and/or an angle defined by two consecutive spans. According to another aspect of the present invention, the spline preparation stage 20 also selects the type of spline curve to be used, and therefore how the spline span will connect with other spans, based upon the characteristics of the previous and subsequent spans.

The stage processor 18 could also include other span preparation stages 30, such as stages which allow for cutter diameter compensation, insertion of circular blend spans, insertion of spline corner blend spans, combining of colinear spans, polar coordinate interpolation commands and cylindrical coordinates interpolation commands for example.

Once the stage processor 18 completes the processing of span data, it can be fed to a forward transform stage 26. Forward transform is the process where span data is transformed to machine tool coordinates which can be interpolated. In this stage, the span data can also be modified to account for various classes of translational and rotational offsets. With respect to those spans that have been automatically designated for spline interpolation by the spline preparation stage 20, the forward transform stage calculates parameters for coefficient matrices to define the particular spline curve to be used. For spans that the stage processor 18 determines are to be interpolated linearly or circularly, the forward transform 26 supplies the required parameters for these spans as well.

A position command generator 32 receives the complete span data after it has been fully prepared through all preparation stages including the spline stage 20, forward transform stage 26, and velocity constraint stage (not shown). The position command generator 32 generates position commands from the completed span data. The position command generator 32 includes an interpolator for interpolating intermediate points between the datapoints that make up a span, according to equations.

The position commands from the position command generator 32 can then be fed to a feedforward command generator 34 and a position controller 36. In the position controller 36, these position commands are compared to position feedback measurements derived from a sensor 44, and the position controller then applies a gain and develops a velocity command component. The velocity command developed by this position loop of the position controller 36 is summed with a velocity feedforward velocity command, which is developed by the feedforward command generator 34 based on position commands. The sum of the position loop's velocity command and the velocity feedforward command is applied as a total velocity command to a servo controller 40. The servo-controller develops a voltage command signal to be fed to a PWM (pulse width modulation) amplifier 41, as known in the art, by operating on the velocity command, feedback measurements of velocity and angle from the sensor 44, and current feedback measurements from the amplifier 41. To achieve the velocity control, the servocontroller 40 can include a PI (Proportional Integral) or other type of compensator, with programmable gains, as well as one or more loop shaping filters.

The voltage commands from the servo-controller 40 control the PWM amplifier 41. Three-phase voltages are switched via the PWM amplifier 41 to the actuator 42, which can be an AC electric motor (permanent magnet "brushless DC" motor). Consequently, three phase currents are developed in the lines connecting the amplifier 41 and motor 42, and the amplitudes of these currents are detected and fed back to the servo-controller 40 in a current control loop configuration. In response to the three phase currents, the motor 42 is rotated and a movable member 43 (e.g., a workpiece or tool) connected to the motor via a suitable linkage, is moved.

As can be understood, the CNC 12 and servocontroller 40 can be embodied in a number of configurations, circuits and devices. For example, these units can be embodied in digital circuitry, such as one or more program, programs, or subprograms stored in a persistent storage medium, and executed by one or more controllers or processors in conjunction with other circuitry and devices. These units can also be embodied as one or more special purpose apparatus having executable instructions stored in a RAM or ROM, or a combination of both. Moreover, the instructions and/or programs can be implemented in any conventional programming language, such as, for example, C, or C++, or can be implemented in a special purpose programming language.

An encoder or a resolver could be used as the sensor 44 for determining the position and velocity of the motor 42. Also, although motor 42 is disclosed in one embodiment as an AC electric motor, the present invention can be used with any actuator and drive type including DC motors, hydraulic servos, brushless motors, linear motors, stepper motors, etc. The type of servocontroller 40 and amplifier 41 used can vary depending upon the type of motors and the application, and can comprise, for example, any of a variety of analog or digital drive systems which control the power supplied to the motor. Moreover, the spline interpolation system of the present invention can be used in a variety of motion control applications, including robotics and industrial automation equipment, for example.

Figure 2A:
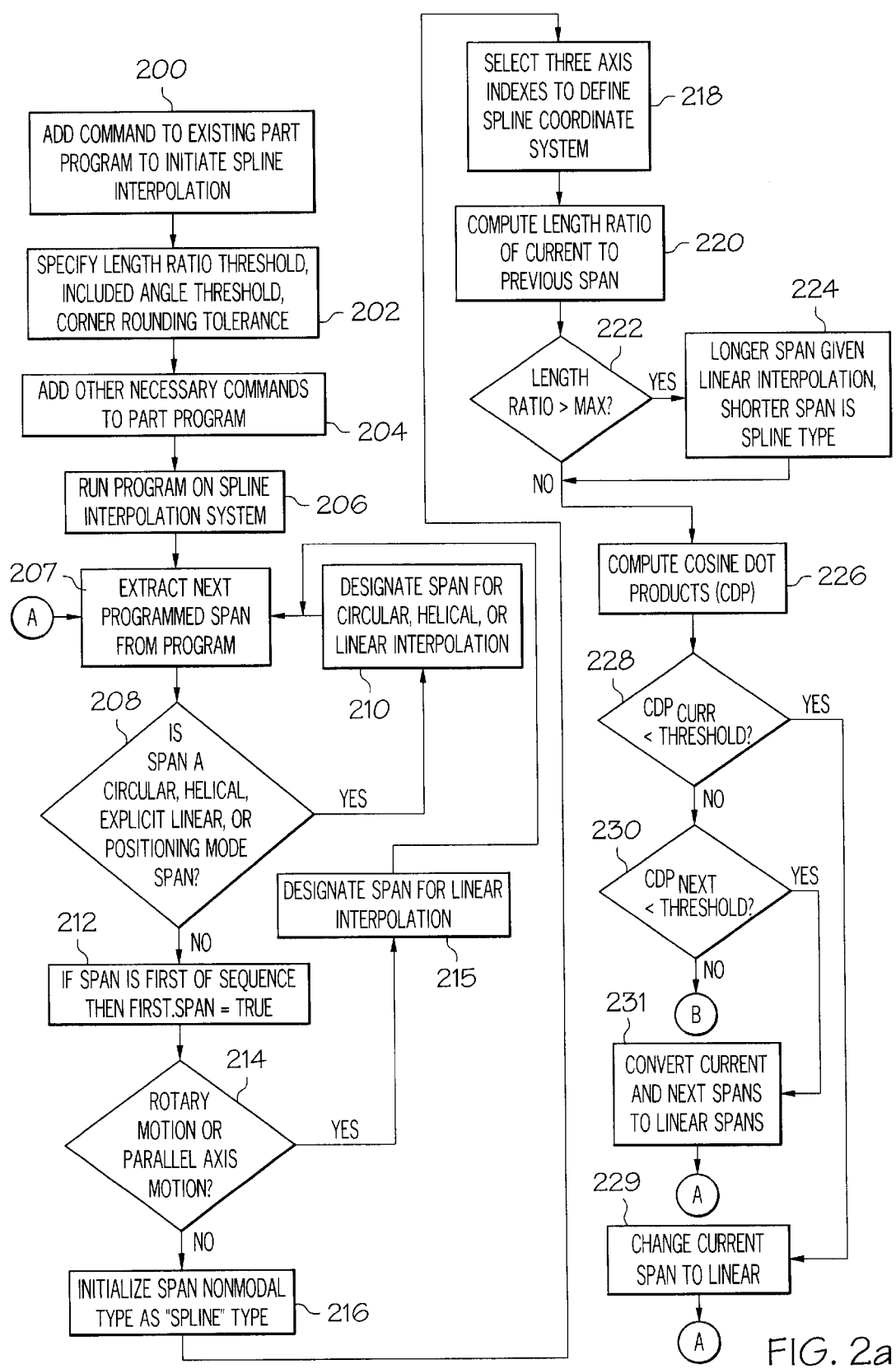
FIG. 2 is a flow diagram illustrating an embodiment of a spline interpolation algorithm, which operates in accordance with principles of the present invention.
Figure 2B:
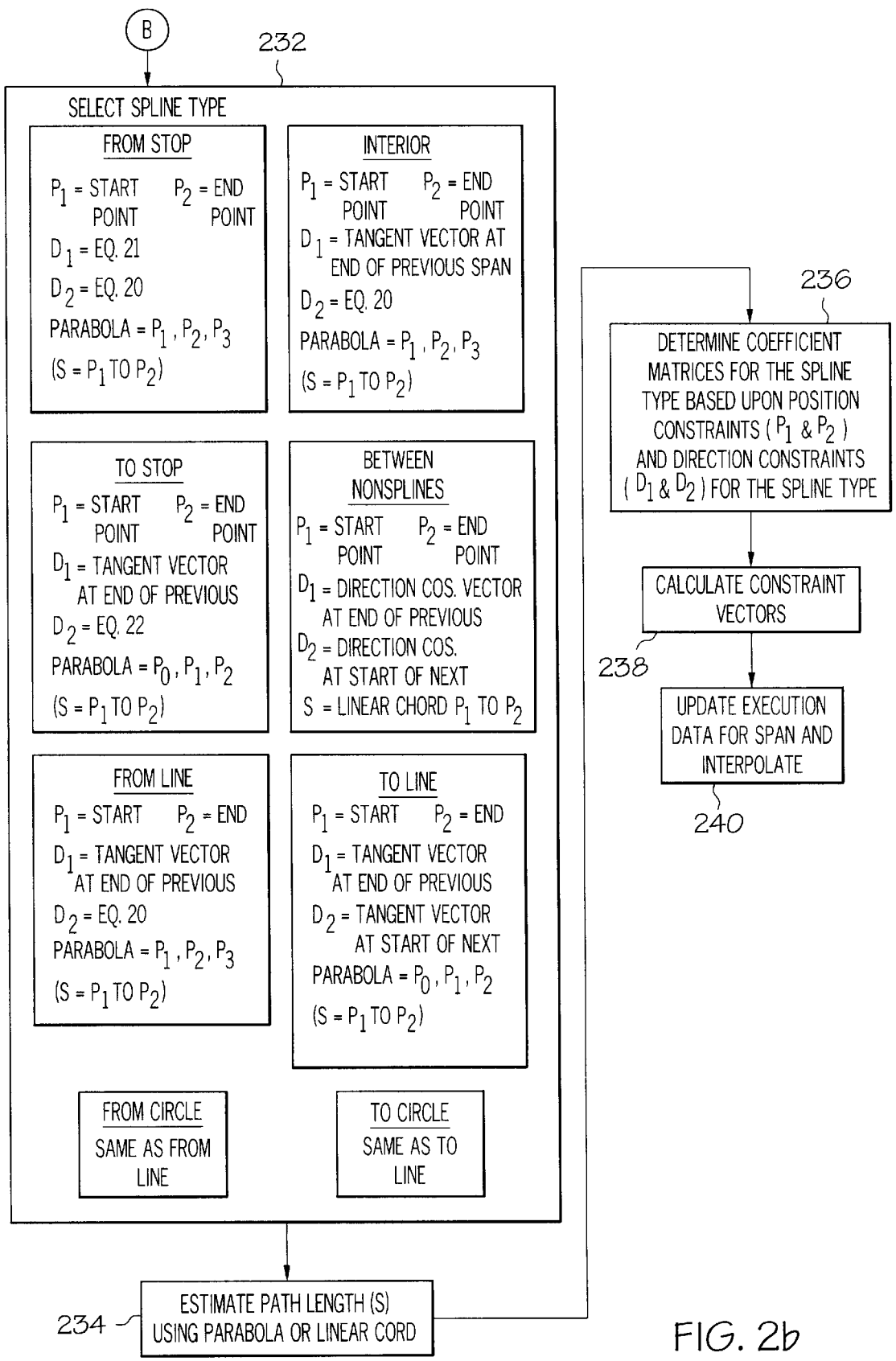

An exemplary operation of the components of the embodiment of FIG. 1 will now be described in more detail. FIG. 2, starting at FIG. 2a and continuing to FIG. 2b, is a flow diagram illustrating generally an embodiment of a spline interpolation algorithm, which operates in accordance with principles of the present invention.

Generally, in this embodiment, when spline interpolation is activated, the algorithm decides whether a smooth curve was intended between programmed endpoints from the part program (or from similar points which have been transformed by some other span preparation function). If so, then the program inserts a spline curve between the endpoints. If not, then the points are interpolated linearly (unless circular or helical interpolation has been commanded for the spans, in which case the circular or helical command will override the other interpolations). By making such decisions, the algorithm can distinguish spans that were intended to remain as flat sections, spans which were intended to define sharp corners, and spans which were intended to define a smooth curve.

In addition, according to another aspect of the invention, the endpoints that are used to conduct the spline interpolation are identical to the endpoints that would have been used by conventional linear interpolation, and so no additional data is required from the user. The user need only add a command to the part program to identify that the spline interpolation algorithm is to be active. The algorithm then uses geometric information of the part program endpoints to automatically decide which sections of the part program were intended to define smooth contours, and to interpolate these sections with splines, and to decide which sections were intended to define flat sections or sharp corners, and to interpolate these sections so as to maintain the flat section or corner. In one embodiment, such decisions are made based upon the relative lengths between two consecutive spans and/or based upon an angle defined by two consecutive spans. This ability enables a part program that contains smooth contours, flat sections, and sharp corners to be run entirely in spline mode while maintaining the intended path. In contrast, a spline interpolation program that interpolates all points with splines would not be able to maintain sharp corners or flat sections.

Moreover, the algorithm assigns a particular spline type to each span that is to be interpolated using a spline. Based on the spline type, a matrix equation can then be developed which defines the spline to be used for the span, and how the spline span will connect with the previous span and the subsequent span. In many cases, the spline span will be smoothly connected to previous and subsequent spans in order to avoid velocity steps without requiring a full stop. However, in some cases, a full stop will be inserted before or after the spline, in order to maintain a corner. In an exemplary embodiment, the spline equation is parameterized with respect to the spline span's length, which can be estimated by fitting a parabola through the points of the span. By parameterizing the equation using a good estimate of the spline span's length (e.g., by using a parabola), the spline equations are constructed in such a way that the path speed and path acceleration experienced is very close to what has been programmed in the part program and/or is required based on configured data describing the maximum capabilities of the machine axes.

Turning now to more specific aspects of this exemplary embodiment, at block 200 of FIG. 2a, a modal G-code spline command, such as a "G5.1" for example, is inserted into a part program to specify that all subsequent blocks in the program are to be analyzed to determine whether they define a smooth contour, a flat section, or a corner section. (The term "modal" refers to a type of part program command that causes the control to enter a certain mode of operation that applies to and persists throughout subsequent part program blocks until cancelled. By contrast "nonmodal" refers to a type of part program command that causes a certain mode of operation to occur only for the part program block in which the nonmodal command is contained.) A modal reset G code, such as a "G5" for example, can then be used to cancel the spline mode and subsequent blocks are treated using other non-spline interpolation algorithms. As one alternative, spline interpolation could be turned on in the control program itself, rather than via modification to the part program.

The term "nonmodal" is also used internally by the control's span preparation software to identify data that is unique to an individual span. In this way a span may have a modal data item indicating that spline interpolation is requested by the part program, but the actual interpolation type will be based on processing of additional information related to the context of the span. For example, a span may contain modal data items indicating that a span was programmed in linear interpolation mode (G1) and that spline mode (G5.1) is also active. This indicates that the programmer desires that this span be interpolated using spline interpolation. The actual interpolation type used will be either linear or spline depending on the results of a decision making process carried out by the control's span preparation process (the details of this decision making process are presented in an upcoming discussion). The actual interpolation type is referred to as the nonmodal interpolation type: e.g., nonmodal-linear or nonmodal-spline.

Three optional parameters may be programmed along with the "G5.1" code: a length ratio threshold, a maximum angle threshold, and a corner rounding tolerance. As described in further detail below, the length ratio threshold is used to distinguish spans that define flat sections, the maximum angle threshold is used to distinguish spans that define sharp corners, and the corner rounding tolerance is used in cases where corner-rounding blends are to be inserted between two spans that the program determines should be interpolated using linear interpolation. The specification of this data in the part program is shown at step 202 of FIG. 2*a*. In one embodiment, the length ratio threshold has a default value of 2.5, and hardcoded minimum and maximums of 1.5 and 5, respectively. If these extremes are exceeded, then an error message can be displayed. In an exemplary embodiment, the maximum angle threshold also has a default value of 20 degrees, a minimum of 5 degrees, and a maximum of 35 degrees. The programmed values for these three parameters can be set by programming a G5.1 command with I, J, and K "words" following the command. The spans specified after the spline command will be maintained until the modal state is reset, in which case the default values will apply.

In this embodiment, even if the spline mode has been activated, such as by commanding a G5.1, circular and helical interpolation blocks which follow the command are still treated by using circular or helical interpolation for the spans defined in those blocks of code. Accordingly, the algorithm will not disturb a circular or a helical programming code that may be present in a conventional part program, and no changes need be made to such commands. Likewise, the algorithm treats all spans following a modal positioning mode command (such as a G60 for example, where the machine tool is to be simply moved and stopped) using a linear interpolation method. When a positioning mode reset command is encountered, such as a G61 for example, the spline algorithm commences again.

On the other hand, when the spline mode is active, linear interpolation blocks will be redefined as splines, if the spline program determines a smooth contour was intended. Accordingly, an existing part program for machining a complex contour such as a die or mold for example can be modified to benefit from the spline algorithm by simply placing a G5.1 at the beginning of the program. No further parameters are necessary.

However, other commands can be added to the part program if it is desired. For example, if it is desired that the spline program be turned off during certain portions of the part program, the cancel spline mode command of G5 can be used. Spans following the spline cancel command will be interpolated as linear spans (or as circular or helical, if such interpolation is commanded). Spline interpolation will begin again at the next G5.1 in the program. The addition of these other commands to the part program is shown at block 204 of FIG. 2*a*.

Once the part program has been programmed with these codes to allow the spline algorithm to operate, and to explicitly program linear spans, the CNC can be run with the revised program. This is shown as step 206 of FIG. 2*a*. The spline algorithm receives the next sequential span, referred to herein as the "current" span or curr, in the part program. This step is shown as block 207. The spline algorithm then decides whether the current span in the part program has been programmed as being circular or helical, or if it has been programmed explicitly as a linear span (such as by making the spline interpolation inactive via a G5 for example), or if it is a positioning span. This is shown as step 208 of FIG. 2*a*. If the span is circular, or helical, then the span should be designated for interpolation by any appropriate circular or helical interpolation algorithm. If the current span has been explicitly programmed as linear or is a positioning mode span, then a linear interpolation should be given to the span. This step is shown at block 210. The process then continues to the next span in the part program.

However, if the current span is not a circular, helical, explicitly linear, or positioning span, and instead is a modal linear span (i.e., a non-explicitly programmed linear span), then it should be determined whether this span should be re-defined as a nonmodal linear interpolation span or as a nonmodal spline span ("nonmodal" is an adjective that is used herein to indicate that the interpolation type applies to that span only and has been determined based on some amount of processing of the span data by the control). To accomplish this, in this embodiment, the process continues to step 212. At this step, it is determined whether the current span is a first span of a spline sequence. This can be achieved by retrieving the span type for the previous span in the part program, such as by accessing a memory storing this information. If the previous span was the final span of a spline sequence (and therefor is to end in a full stop), if the previous span was a positioning mode span (and therefore is to end in a full stop), or if the previous span was a spline having a spline type TO_STOP (and therefore is to end in a full stop), then a variable (e.g., "first_span") is set to indicate that the span is the first span of a sequence.

During the next step, step 214, it is determined whether there is rotary axis motion or parallel axis motion in the span, by examining the type of motion commanded by the part program and the axes on which the motion is to take place. Rotary motion is detected if the span requires a change in the position of one or more rotary axes relative to their positions at the end of the previous span. A spline is not used for a span that requires motion on two axes that are parallel to each other because there is not sufficient information to determine each parallel axis' contribution to the overall motion in the direction. A spline is not used for a span having rotary axis motion because, while a spline can be calculated in three-dimensional space, rotational orientation adds complexity.

Accordingly, if the span involves motion along a rotary axis, then the span should be designated for linear interpolation, not spline interpolation, as shown at block 215. This span can also be designated to start and end in a full stop. Whether or not spans that involve rotary axis motion should end in a full stop may be configurable. Also, if the span involves parallel axis motion (motion outside of the established three dimensional linear coordinate system), then the span should also be interpolated as a linear span that may, depending on the configured preference, start and end with a full stop, as shown at block 215. For example a machine tool may contain more than three linear axes where the designators U, V, and W describe programmable axes that are parallel to X, Y, and Z respectively. If the span included motion in the U and the X axes, for example, then parallel axis motion has been commanded, and step 215 should be executed, where the span is interpolated linearly with full stops.

Otherwise, if neither of these conditions exist, then the span can be designated as a spline type span, as shown at block 216, and the spline preparation process continues. However, as will described in detail below, this designation as a spline type can be changed such that the span is changed back to a linear type, if it is decided that a linear span or a corner was intended by the part program.

At the next step, step 218, three axis indexes, or designators, are selected to define the Cartesian coordinate system in which the spline span is to be interpolated. Any three non-parallel linear axes can be chosen to define the Cartesian space. For example, a part program code section could command motion over a span on any combination of the existing programmable axes, such as the X, V, and W axes for example, as illustrated by the following G-code portion:

G5.1 G1 X10 Y10 Z10 U10 V10 W10
X20 Y10 Z10 U10 V20 W20 where the G5.1 is the command added to the program to initiate the spline feature and G1 is the existing command in the program indicating a linear cut. In this example, the span start point is (10, 10, 10, 10, 10, 10) and the span endpoint is (20, 10, 10, 10, 20, 20). Thus, this span calls for motion on the X, V, and W axes. Thus, in this example, the designators for the local spline coordinate system (x, y, z) would be the programmable axes X, V, W. In the case where straight line motion is detected in less than three dimensions, the axis index for the non-motion axis can be determined from the corresponding dimension from the previous span. If there is not a previous span (e.g., the current span is the first span of a spline group), then the axis for the non-motion span can be selected to be a default axis which is perpendicular to a dimension that does involve motion. For example, if the current span in the part program calls for motion in the Y and W axes, the spline local x-axis can be selected as the X programmable axis, because X is perpendicular to Y in the default system. Other solutions would include programming motion in the first span of a spline group that exists a non-default Cartesian coordinate system, or configuring the default perpendicular system to be something other than XYZ and UVW (e.g., XVZ and UYW).

Once the local spline coordinate axes are selected, the process continues to step 220, where the span length ratio is calculated using the length of the current span and the length of the previous span in the program. In this embodiment, the relative lengths of a pair of consecutive spans is used to automatically determine when a flat span was intended in the part program and when a smooth curve was intended. If the length ratio for a pair of consecutive spans is greater than a maximum length ratio, then the longer of the two spans is interpolated as a linear span and the shorter spans is potentially interpolated as a spline. A span that is long relative to its neighbors is considered a linear span because, in a part program, a contour whose curvature is smoothly varying will have spans that change gradually in length. If the long span was not interpolated as a line and was instead interpolated using a spline function which passes through its endpoints, the resulting spline could substantially deviate from the linear chord, which could affect accuracy and surface finish. According to this aspect of the present invention, sections in the part program which were intended to be flat can be identified and can be maintained as flat, rather than changed to a spline curve.

Examining length ratio is one way of distinguishing flat sections from contoured sections in a part program. Other methods could also be used such as examining the length deviation of two or more spans, for example.

However, in this embodiment, length ratio is used and is calculated by dividing the greater of the linear chord lengths of the two spans by the lesser of the linear chord lengths of the two spans:

$$LR_{CURR} = \frac{\max(L_{CURR}, L_{PREV})}{\min(L_{CURR}, L_{PREV})} \quad (1)$$

As noted earlier the maximum length ratio can be entered in the part program by the user, and can be between 1.5 and 5.0. Experimentation with a number of typical part programs has shown that a reasonable value for maximum length ratio is around 2.5, and this can be used as a default, as noted earlier.

Blocks 222 through 231 represent a general decision making procedure to determine whether previous, current, and next spans should be interpolated using a linear interpolation algorithm or using a spline interpolation algorithm, according to one embodiment of the present invention. According to this embodiment of the invention, $LR_{curr}$ is compared to this maximum at step 222. If the maximum is exceeded, the longer span is changed to a linear interpolation type, and the shorter span is maintained as a spline type, as shown at block 224.

Figure 3:
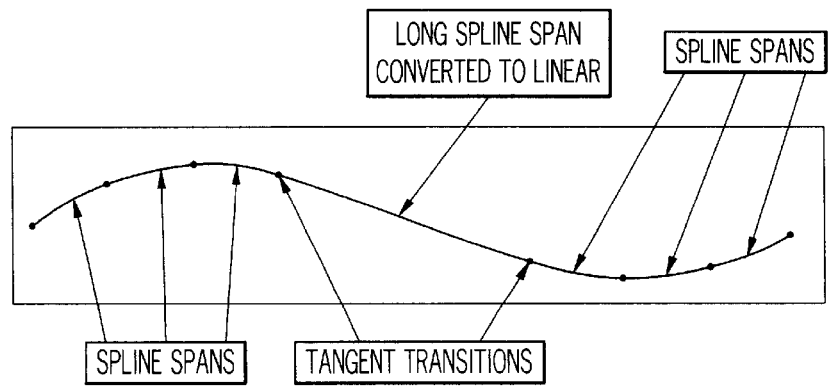
FIG. 3 illustrates a spline span on a motion path which has been converted to a linear span because its length ratio with respect to a consecutive span was outside of an allowable range, according to principles of the present invention.

Length ratio is generally only meaningful for a pair of spans that involve motion in the same three-dimensional Cartesian coordinate system. The length ratio between two spans which exist in different Cartesian systems are not considered by this embodiment. A contiguous sequence of spline spans is considered a spline sequence when each span in the sequence moves in the same three-dimensional Cartesian system. A new sequence is defined when a new span contains motion in a different Cartesian system than the previous spans. The length ratio need not be computed for the spans that span the boundary between sequences because considerations based on length ratio are not required in such a case. In sum, and with reference to FIG. 3, the algorithm of this embodiment does not attempt to fit a smooth curve between two consecutive spans whose lengths are very dissimilar. If the ratio of the length of the long span to the length of the short span is greater than the programmed (or default) threshold, the algorithm redefines the long span as flat (i.e., as being a span to be linearly interpolated). The short span maintains the potential to be interpolated as a spline curve. Also, according to another aspect of the invention described in more detail below, the short span smoothly joins the long linear span in such a way that its tangent vector is coincident with that of the linear span. The short span is said to have the potential to be interpolated as a spline span. Cases exist where the short span is not interpolated as a spline span, but instead is interpolated as a linear span. One case occurs when the change in direction of the short span's linear chord and the long (now linear) span is greater than a defined maximum angle (discussed below). Another case occurs when the second span adjacent to the short (the adjacent span that is not the so-called "long span" in this context) is substantially shorter than the short span as to exceed the maximum length ratio.

Alternatives to the LR method for detecting flat sections of a part program can be utilized. For example, the percent difference in the length of two spans could be compared to a percentage tolerance. Another possibility would be to set an absolute maximum length for a spline span, and if the length is exceeded, then the spline span should be linearly interpolated. Such a method could be used in addition to the LR method.

Referring again to FIG. 2a, the process then continues to step 226, where the change in direction of two consecutive spans is used to determine whether spans should be interpolated using splines or lines. At this step of this embodiment, the cosine dot product (CDP) for the current span is calculated. The CDP associated with the current span's data is the dot product of the previous span's end of span tangent vector and the direction cosine vector of the current spans linear chord. Thus, the CDP is one way to measure of the change of direction between a unit direction vector for the current span and a unit direction vector for the previous span. In other words, the CDP is an indication of the change in direction from one linear span to the other. If the CDP falls below a predetermined threshold, then the change in direction is sharp, indicating that a sharp angle was intended, and that the current span and the previous span should be linear. If desired, a rounded corner can be inserted between the linear spans to maintain smooth motion. In particular, as shown at step 228, the CDP for the current span is compared to the cosine of the specified angle threshold for the span (provided at step 202), and if the CDP is less than this cosine threshold, step 229 is executed converting the span types to linear. As noted earlier, in one embodiment, this threshold can be between 5 and 35 degrees, and, in an exemplary embodiment, is around 20 degrees.

If it is determined that the current span should remain as a spline type, as described in further detail below, the CDP for the next span and for the span following the next span (i.e., the "last" span) can be used to determine exactly what type of spline should be used. The CDP for the current, next and last spans can be calculated using the following equations, where $\hat{t}$ indicates a tangent vector, $\hat{c}$ indicates a direction cosine, EOS indicates an end of span location, and SOS indicates a start of span location:

$$CDP_{CURR} = \hat{t}_{PREV-EOS} \cdot \hat{c}_{CURR-SOS}$$

$$CDP_{NEXT} = \hat{c}_{CURR-EOS} \cdot \hat{c}_{NEXT-SOS}$$

$$CDP_{LAST} = \hat{c}_{NEXT-EOS} \cdot \hat{c}_{LAST-SOS} \qquad (2)$$

The CDP for the next span can be compared to the cosine of the maximum angle threshold at block 230. If the CDP is below the cosine threshold, step 231 is executed converting the current and next spans to linear spans, and the process returns to step 207 to extract the next span from the program.

Figure 4:
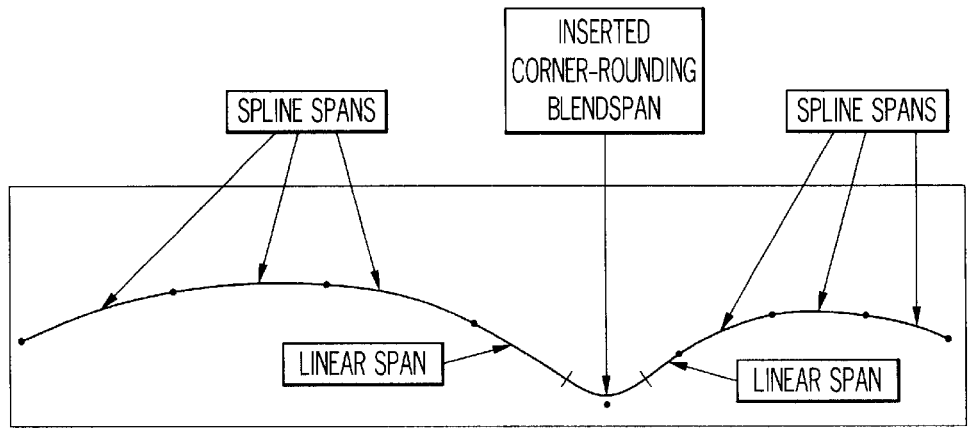
FIG. 4 illustrates a pair of spans on a motion path which have been converted to linear spans because the angle defined by the two spans was outside of an allowable range, according to another aspect of the present invention.

According to this aspect of the present invention, sharp corners that were intended in the part program can be maintained, and will not be connected smoothly. The algorithm does not attempt to smoothly connect two consecutive spans whose cord vectors have a direction change angle whose absolute value is greater than the maximum angle threshold. When the threshold is exceeded each span is interpolated as if it were linear. The spans adjacent to the linear spans are defined as spline spans that join the linear spans in such a way that their tangent vectors are coincident, as described in further detail below and as shown in FIG. 4. If a corner-rounding feature is included in the control system, a round corner can be inserted between the two linear spans. Otherwise, a full stop may be used between the two.

Figure 5:
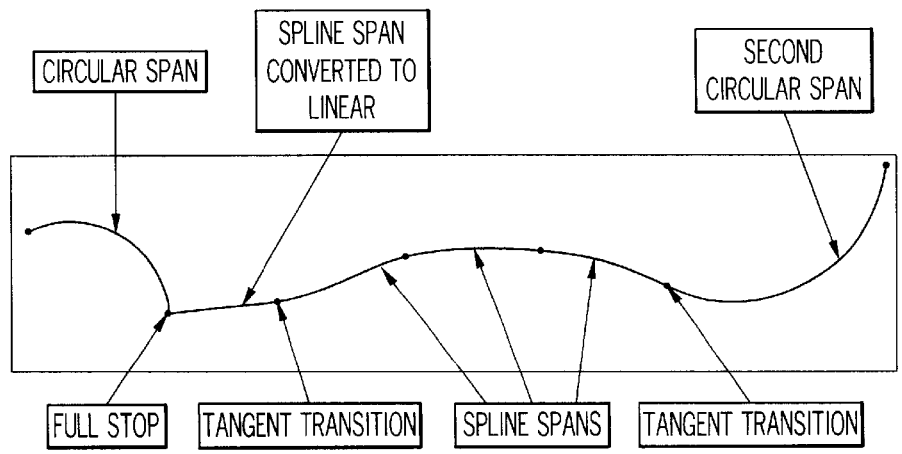
FIG. 5 illustrates tangent transitions between spans on a motion path, as well as non-tangent, full-stop transitions which are made when two spans define an angle outside of an allowable range, according to principles of the present invention.

In the case where the previous span is circular, helical, reassigned as linear, or explicitly linear, the algorithm normally joins spline spans tangentially to the previous circular, helical, or linear spans, as described in further detail below. However, as shown in FIG. 5, a tangent connection is not made if the spline span's chord vector has a direction change relative to the previous linear/circular/helical span's tangent vector that is greater than the maximum angle threshold. Rather, in this circumstance, the spline span is converted to a linear span. If the previous span is linear, a corner round can be inserted (if such behavior is desired as indicated in the part program with a modal G code). Otherwise, a full stop is used following the previous span. As shown in FIG. 5, the second circular span does connect tangentially with the previous spline span. This is because the $CDP_{next}$ for the previous spline span exceeded the threshold. Various methods of determining sharpness of corners, or change in direction, defined by spans in the part program could be utilized as alternatives to the CDP method, such as by comparing a threshold value to the angle defined by two consecutive spans, for example. As another example, the magnitude of the difference of the direction cosine components of consecutive spans can be compared to a threshold. If the magnitude of any of the three difference components exceeds the threshold, then the corner can be considered sharp, and should not be smoothly traversed with splines. As another alternative, the percentage change in direction cosine components could be compared to a threshold.

Returning again to FIG. 2, if it is determined that the current span was not intended to be a part of a flat section or a sharp corner, such as by using length ratios or CDP's then the current span can be interpolated using a spline, and the process continues to step 232 of FIG. 2b. If this step is reached, the span is still of the spline type and has not been converted to a linear span type. However, its specific spline type needs to be selected, and this occurs at step 232. The type of spline determines how the parameters for the spline equation will be calculated, and, therefore, how the spline will connect with previous and next spans. At this step, the spline type is selected to be one of the following based upon the previous span and the next span:

INTERIOR—The span type for the current and next span are both of the spline type and there is not to be a stop between these spans. This span will be joined to these adjacent spans with coincident unit tangent vectors at each boundary.

TO_STOP—A spline span that is the final spline of a sequence or group. Accordingly, the geometry of the span will be determined without using any information from the next or last span, and a deceleration to zero condition is imposed on the span.

FROM_STOP—A spline span that is the first of a spline sequence. The geometry of the span will be determined without using any information from the prev span.

FROM_LINE—The previous span is a linear span and the $CDP_{curr}$ is greater than the cosine of the maximum angle threshold (or else it would have been converted to linear at step 229). This spline span will have a unit tangent vector at the start of span which is coincident with the unit tangent vector of the linear span.

FROM_CIRCLE—The previous span is a circular span and the $CDP_{curr}$ is greater than the cosine of the maximum angle threshold (or else it would have been converted to linear). This spline span will have a unit tangent vector at the start of span which is coincident with the unit tangent vector at the end of the circular span.

TO_LINE—The next span is a line and the $CDP_{next}$ is greater than the cosine of the maximum angle threshold. The end of this spline span will transition into the linear span with a unit tangent vector which is coincident with the unit tangent vector of the linear span.

TO_CIRCLE—The next span is a circular or helical span and the $CDP_{next}$ is greater than the cosine of the maximum angle threshold. This spline span will transition into a circular or helical span with a unit tangent vector which is coincident with the unit tangent vector at the start of the circular span.

BETWEEN—A spline span where the prev and next spans are both non-spline, i.e., linear or circular or helical. The CDP$_{next}$ and the CDP$_{curr}$ are greater than the cosine of the maximum angle threshold. An additional requirement to ensure good path length parameterization for a between spline span can be that the dot product of the previous (non-spline) span's end of span tangent vector and the next (non-spline) spans start of span tangent vector is above a predetermined threshold. For this spline span, the transition at the start of span and end of span will contain unit tangent vectors that are equal to the unit tangent vectors of the non-spline spans at the transition points.

Thus, after step 232, the span has been assigned either a linear, circular, or helical interpolation type, or one of the various spline interpolation types. The algorithm automatically selects the span type even when the part program involves smooth contours, sharp corners, and flat corners, as it detects the intention of the part program with respect to the feature being described.

Once the span has been defined as one of the spline types, the equation for the spline can be calculated, as well as the spline interpolation data for the span. These steps are shown as steps 234, 236, 238, and 240 of FIG. 2. In general, these steps involve estimating the length for the spline span, determining the spline coefficient matrix based upon the spline type, computing constraint vectors for limiting velocity and acceleration, and computing the span interpolation data.

In an exemplary embodiment, the spline polynomial is parameterized with respect to distance along the spline path. This allows for velocity control to be decoupled from the interpolation, allowing for simultaneous complete control of the instantaneous feedrate and acceleration along the path along with complete control of the shape of the path.

Accordingly, in order to determine the spline polynomial coefficients, the length of the spline span should be known. However, in order to determine the span length, the polynomial coefficients should be known. One solution to this dilemma is to obtain a good estimate for the span length. If a good initial estimate for span length is used, then the polynomial's independent parameter will very closely approximate the distance along the path.

One technique for estimating the span length is to fit a parabola through three consecutive programmed points, such as the current span's start point, the current span's end point, and the next span's end point. The technique of using a parabola to estimate path length has been found to work well for all but one of the spline types. For the remaining spline type (Between), a linear chord from the span start point P1 to the span end point P2 is used to estimate the span length.

For the spline types that use the parabola estimation technique, the points that are used for determining the parabola vary depending on the spline type. The parabola is fit through points P1, P2, and P3 (the prev, curr and next span's end points, respectively) for most of the spline types. However, for the To Stop, To Line, and To Circle spline types, the parabola is fit through the points P0 (the previous span's start point), P1, and P2 in this embodiment. An exemplary method of span estimation for each spline type is indicated in block 232 of FIG. 2.

Of course an infinite number of parabolas could fit through three points. However, according to one aspect of the invention, a set of rules has been developed for determining an optimum parabola for estimating span length, and these rules have been found to produce good results over using other parabolas, higher order polynomials, circular arcs, or straight line distances.

Figure 6:
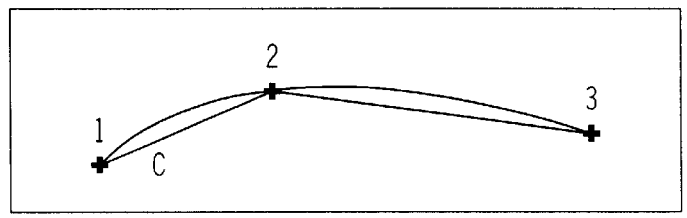
FIG. 6 shows a technique for estimating spline span length using a parabola, according to one aspect of the present invention.

FIG. 6 shows a technique for estimating spline span length using a parabola, which is to fit the parabola through the three points such that the parabola "vertex" is coincident with point 2. The parabola "vertex" is the location where the parabola is extremized when rotated into a 2-dimensional coordinate system such that the parabola can be represented by an equation of the form y=ax^2+c. (A function is said to be "extremized" when the function takes on either a maximum or minimum value relative to the surrounding locations on the function.) Experimentation for a wide range of cases shows that this technique results in a spline whose parameter very closely approximates the distance along the curve. As noted, in one embodiment, this technique is used for all but the "Between" spline type. Also, for the other spline types that use this technique, the points that make up the parabola may vary depending on the spline type.

Since three points define a plane, the equations for the parabola can be represented in a two dimensional coordinate system with coordinates x and y. The length of a parabolic segment will not vary with the coordinate system used to define the parabola. Thus, the span length estimates may be defined in the two dimensional local coordinate system.

Figure 7:
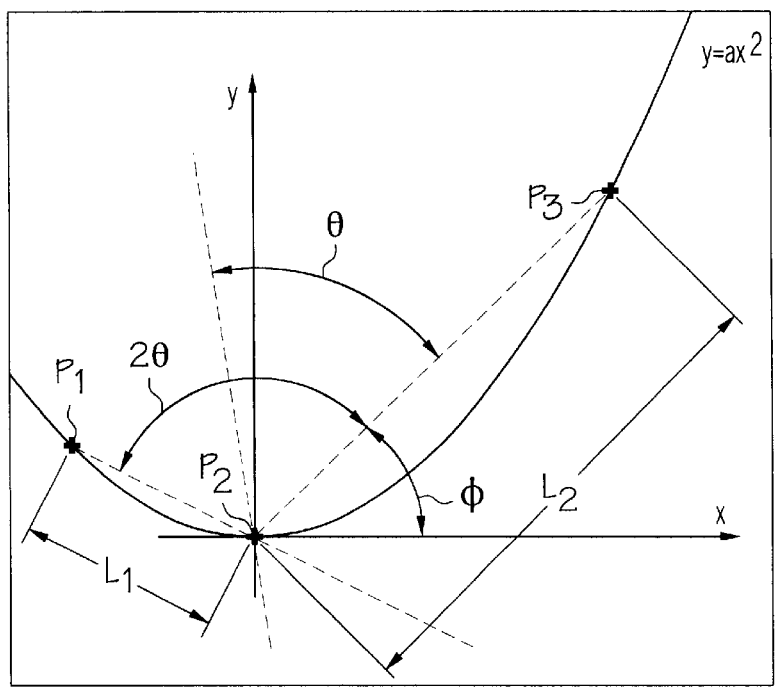
FIG. 7 illustrates the geometry of a parabola that can be used to estimate a spline span length, according to principles of the present invention.

Although the three points define a plane, the orientation of the x-y coordinates within this plane may be arbitrary. Referring now to FIG. 7, to simplify calculations, the position and orientation of the x-y coordinate system can be chosen such that the parabola can be represented by the equation y=ax$^2$. This implies that the minimum point of the parabola is at (0,0). The orientation of the coordinate system is such that the y-axis defines the parabola's axis of symmetry.

The following equations show how an equation for an exemplary parabola for estimating spline path length can be developed. In these equations, small letters represent quantities in the local coordinate system and large letters represent quantities in the machine tool coordinate system. The expressions for transforming from the machine tool coordinate system to the local coordinate system are given below in equation (3). In this equation R is a (3×2) rotation matrix. The notation X, Y, Z for the machine tool coordinate system is meant to represent the spline Cartesian system coordinates.

$$P = \begin{Bmatrix} X \\ Y \\ Z \end{Bmatrix} = [R] \begin{Bmatrix} x \\ y \end{Bmatrix} + \begin{Bmatrix} T_x \\ T_y \\ T_z \end{Bmatrix} \quad (3)$$

The lengths of the linear distances between points can be computed from the machine coordinates of the programmed points.

$$L_1 = \|P_2 - P_1\| = \sqrt{(X_2-X_1)^2 + (Y_2-Y_1)^2 + (Z_2-Z_1)^2}$$

$$L_2 = \|P_3 - P_2\| = \sqrt{(X_3-X_2)^2 + (Y_3-Y_2)^2 + (Z_3-Z_2)^2} \quad (4)$$

The angle 2θ is the angle between the line P$_1$P$_2$ and the line P$_2$P$_3$ and can be determined from the following equation.

$$\cos(2\theta) = \frac{P_1 - P_2}{\|P_2 - P_1\|} \cdot \frac{P_3 - P_2}{\|P_3 - P_2\|} \quad (5)$$

The local coordinate representation of points P$_1$ and P$_3$ can then be defined in terms of the angles θ, φ and the lengths L$_1$, L$_2$ using basic trigonometry formulas as shown below.

$$y_1 = L_1 \sin(2\theta+\phi), \quad y_3 = L_2 \sin(\phi)$$

$$x_1 = L_1 \cos(2\theta+\phi), \quad x_3 = L_2 \cos(\phi) \qquad (6)$$

An equation involving only the unknowns: $\alpha$ and $\phi$, can then be obtained by combining the above equations with the equation for the parabola.

$$y = a_x^2 \qquad (7)$$

The result is two equations in two unknowns.

$$L_2 \sin(\phi) = \alpha L_2^2 \cos^2(\phi)$$

$$L_1 \sin(2\theta+\phi) = \alpha L_1^2 \cos^2(2\theta+\phi) \qquad (8)$$

When applying formulas for sines and cosines of sums of angles the two equations take the following form.

$$\sin(\phi) = \alpha L_2 \cos^2(\phi)$$

$$\sin(2\theta)\cos(\phi)+\cos(2\theta)\sin(\phi) = \alpha L_1 (\cos^2(2\theta)\cos^2(\phi) + \sin^2(2\theta)\sin^2(\phi) - 2\sin(2\theta)\cos(2\theta)\sin(\phi)\cos(\phi)) \qquad (9)$$

Dividing the second equation by the first equation leads to a cubic equation in the tangent of $\phi$.

$$c_3 t^3 + c_2 t^2 + c_1 t + c_0 = 0 \qquad (10)$$

$$t = \tan(\phi),$$

$$c_3 = \frac{L_1}{L_2} \sin^2(2\theta),$$

$$c_2 = \frac{-2L_1}{L_2} \sin(2\theta)\cos(2\theta),$$

$$c_1 = \frac{L_1}{L_2} \cos^2(2\theta) - \cos(2\theta),$$

$$c_0 = -\sin(2\theta)$$

The cubic equation in t can then be solved using the formula for the roots of a cubic polynomial, and the inverse tangent of the real positive root yields the angle $\phi$. Once $\phi$ is determined, it can be substituted into the first of equations (9) to obtain the parameter $\alpha$.

After the parameter a has been determined, the length of the parabola segment can be found. The equation for the length of each parabola segment can be determined as follows. The lengths along the parabola from the point $P_2=(0,0)$ to the points $P_1$ and $P_3$ can be computed with the integral:

$$S_{23} = \int_0^{S(P_3)} ds, \quad S_{21} = \int_0^{S(P_1)} ds \qquad (11)$$

These integrals can be evaluated by expressing ds in terms of x and y.

$$ds = \sqrt{dx^2 + dy^2} \qquad (12)$$

The equation for $(dy)^2$ is known to be:

$$(dy)^2 = \left(\frac{dy}{dx}\right)^2 (dx)^2 = \left(\frac{d}{dx}(ax^2)\right)^2 (dx)^2 = 4a^2 x^2 (dx)^2 \qquad (13)$$

Thus, the equation for ds becomes:

$$ds = dx\sqrt{1+4a^2 x^2} \qquad (14)$$

An integral can then be obtained whose solution is known and can be found by looking up the answer in a table. Tables with solutions for integrals can be found in many mathematics textbooks. In this equation, x defines a point on the parabola and S(x) is the length of the parabola segment from point $p_2=(0,0)$ to the point on the parabola with the x-coordinate x.

$$S(x) = \int_0^x \sqrt{1+4a^2 v^2}\, dv = \frac{1}{4a}\left(2ax \cdot \sqrt{4ax^2+1} + \ln(2ax + \sqrt{4ax^2+1})\right) \qquad (15)$$

In addition to the length of the parabola segments, the spline interpolation algorithm sometimes requires knowledge of one of the unit tangent vectors and curvature vectors at a point along the parabolic path. The tangent and curvature vectors can be obtained in the local two dimensional coordinate frame using equations to be identified later. The span preparation algorithm, however, requires that these quantities be represented in terns of the machine coordinate system. Therefore, the rotation matrix describing the orientation of the local parabola coordinate system with respect to the machine tool coordinate system should be obtained. The rotation matrix is obtained by manipulating the transformation equation shown below.

$$\begin{bmatrix} X_1 & X_3 \\ Y_1 & Y_3 \\ Z_1 & Z_3 \end{bmatrix} = [R] \begin{bmatrix} x_1 & x_3 \\ y_1 & y_3 \end{bmatrix} + \begin{Bmatrix} T_x \\ T_y \\ T_z \end{Bmatrix} \qquad (16)$$

When examining FIG. 7, it is apparent that $\{T_x\ T_y\ T_z\}$ is equivalent to $\{X_2\ Y_2\ Z_2\}$. Subtracting $P_2$ from both sides leads to the equation:

$$\begin{bmatrix} X_1-X_2 & X_3-X_2 \\ Y_1-Y_2 & Y_3-Y_2 \\ Z_1-Z_2 & Z_3-Z_2 \end{bmatrix} = [R] \begin{bmatrix} x_1 & x_3 \\ y_1 & y_3 \end{bmatrix} \qquad (17)$$

The above can be solved directly for the (3×2) rotation matrix R by inverting the (2×2) matrix.

$$[R] = \begin{bmatrix} X_1-X_2 & X_3-X_2 \\ Y_1-Y_2 & Y_3-Y_2 \\ Z_1-Z_2 & Z_3-Z_2 \end{bmatrix} \begin{bmatrix} y_3 & -x_3 \\ -y_1 & x_1 \end{bmatrix} \frac{1}{x_1 y_3 - x_3 y_1} \qquad (18)$$

Turning again to FIG. 2b, once the path length is estimated at step 234 (such as by using the optimum parabola equations described above), the spline algorithm can determine coefficient matrices for the particular spline type that has been selected during step 232. According to this aspect of the invention, the coefficients of the spline polynomial are different for each spline type because the shape and nature of the spline curve is to be tailored to the particular geometry required for the spline type (e.g., if it is to connect tangentially with a previous or next span). According to an exemplary embodiment, a third order polynomial is used for the spline, as such a spline has been found to work well in terms of control processing and machine operation.

One technique for deriving the spline coefficient matrix is essentially the same for all the spline types. The difference lies in the particular constraints used to derive the coefficients of the polynomial. Accordingly, the basic technique will be described with respect to the "interior" spline type, and techniques for deriving the coefficients for other spline types will be evident from this description.

Generally, according to an exemplary embodiment of the present invention, polynomial for spline spans is of the third order with a position and direction constraint imposed on each endpoint of the span. As noted earlier, this polynomial can vary according to distance along the path. The spline polynomial is most conveniently represented by the following matrix equation, where the parameter u is the distance along the path, and [A] is a 3×4 matrix of coefficients. The notation X, Y, Z is used to indicate the axes which correspond to the span's data for the three axis indices which were chosen for the span at step 218.

$$P(u) = \begin{Bmatrix} X(u) \\ Y(u) \\ Z(u) \end{Bmatrix} = [A] \begin{Bmatrix} u^3 \\ u^2 \\ u \\ 1 \end{Bmatrix} \quad (19)$$

In this embodiment, the coefficient matrix [A] is determined by applying position and direction constraints to the span end points.

For all spline types of this embodiment, the position constraints are always imposed from the start of span point $P_1$ and the end of span point $P_2$, thereby ensuring that the spline passes through the two points of the span. The direction constraint is enforced by setting the unit tangent vector at either the start of span point or end of span point to be equal to some specified value, which is selected based upon the spline type, which, in turn, is based upon how it is to connect with the previous span and the next span. The unit tangent vector along the polynomial is obtained by differentiating the polynomial with respect to its length parameter u.

Accordingly, using these position and direction constraints for the spline, a constraint equation for the spline can be derived from the general spline equation (19) as follows:

$$[\{P_1\}\ \{P_2\}\ \{D_1\}\ \{D_2\}] = [A] \begin{bmatrix} 0 & S^3 & 0 & 3S^2 \\ 0 & S^2 & 0 & 2S \\ 0 & S & 1 & 1 \\ 1 & 1 & 0 & 0 \end{bmatrix} \quad (20)$$

In this equation, the length of the current span, S, is the length of the first parabola segment, the term $P_1$ is the current span's start of span position (i.e., the end point of the previous span), $P_2$ is the current span's end of span position (i.e., the start point of the next span), $D_1$ is the unit tangent vector at the beginning of the span, and $D_2$ is the unit tangent vector at the end of the span. The equation is derived based on the requirement that u=0 at $P_1$, and u=S at $P_2$.

The cubic spline coefficient matrix A can then be determined by inverting the matrix on the right hand side as follows:

$$[A] = [\{P_1\}\ \{P_2\}\ \{D_1\}\ \{D_2\}] \begin{bmatrix} 0 & S^3 & 0 & 3S^2 \\ 0 & S^2 & 0 & 2S \\ 0 & S & 1 & 1 \\ 1 & 1 & 0 & 0 \end{bmatrix}^{-1} \quad (21)$$

Evaluating the matrix inverse yields the following matrix expression.

$$[A] = [\{P_1\}\ \{P_2\}\ \{D_1\}\ \{D_2\}] \begin{bmatrix} 2/S^3 & -3/S^2 & 0 & 1 \\ -2/S^3 & 3/S^2 & 0 & 0 \\ 1/S^2 & -2/S & 1 & 0 \\ 1/S^2 & -1/S & 0 & 0 \end{bmatrix}. \quad (22)$$

Figure 8:
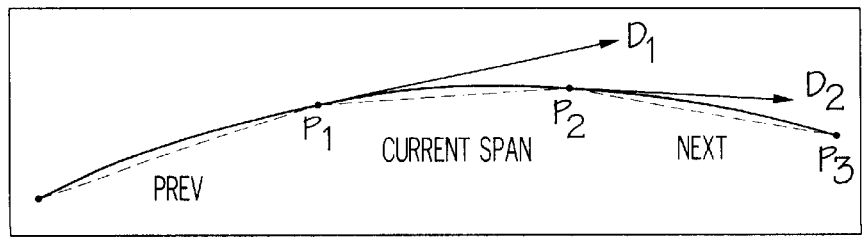
FIG. 8 shows an example of an "interior" spline motion control span, according to one aspect of the present invention.

Accordingly, the coefficient matrix [A] for the spline can be determined, once the position constraints $P_1$ and $P_2$ and the vectors $D_1$ and $D_2$ are known. As noted, these constraints depend upon the spline type. The "interior" spline type is common for many machining applications. This spline is used in the interior of a contiguous sequence of spline spans that are to connect smoothly with each other. This situation occurs in regions of the part program where the contour is smooth and is not interrupted by flats or corners. As mentioned above, an interior spline has previous and next spans that are also splines. FIG. 8 shows an example of an interior spline span. As seen in the figure, the interior spline span joins the previous and next spans with coincident tangent vectors and nearly equal curvatures. The points $P_1$ and $P_2$ and the vectors $D_1$ and $D_2$ are used to derive the interior spline coefficient matrix, [A] to achieve this behavior.

Figure 9:
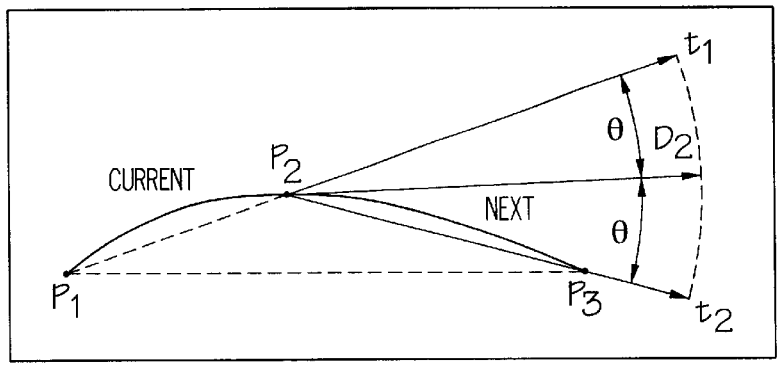
FIG. 9 illustrates a geometric technique which can be used to derive constraints for an interior spline type, such as that of FIG. 8, according to principles of the present invention.

In particular, the position constraints $P_1$ and $P_2$ are imposed from the start of span point $P_1$ and the end of span point $P_2$, such that the spline passes through these two points. This is true for all spline types of this embodiment. For the interior spline, the direction constraint $D_1$ at the start of the span is set to be equal to the direction at the end of the previous spline span, by setting the unit tangent vector at the start of the span to be equal to the unit tangent vector at the end of the previous span. This constraint guarantees continuous axis velocities at the transition between spans. The end of span constraint, $D_2$, for the interior spline is also derived to ensure continuous axis velocities at the transition between the current and next spans. This can be achieved by setting $D_2$ equal to a unit tangent vector that is based on the current and next span's endpoints, as shown in FIG. 9. This direction vector is simply the direction of the line from $P_1$ to $P_3$ In other words, it is the normalized sum of the two unit vectors (i.e., direction cosines) describing the direction of the current and next span's linear chords:

$$D_2 = \frac{P_3 - P_1}{\|P_3 - P_1\|} = \frac{\hat{t}_1 + \hat{t}_2}{\|\hat{t}_1 + \hat{t}_2\|} \quad (23)$$

In sum, in this embodiment, equation (22) is the general equation for finding the matrix coefficients for any spline type. These coefficients determine the spline's behavior. The particular constraints which are chosen for constraints $P_1$ and $P_2$ and the constraints $D_1$ and $D_2$ $_{affect}$ the coefficients, and therefore the spline behavior. For the interior spline type, three points are identified: P1 the start of the current span; P2, the end of the current span; and $P_3$, the end of the next span. The length of the spline span S is estimated by fitting a parabola through the points $P_1$, P2, and $P_3$, and S is set equal to the length of the parabola over the segment between $P_1$, and $P_2$ Next, the start of spline direction constraint $D_1$ is set to be equal to the previous spline span's end of span tangent vector, and the end of span direction $D_2$ is determined from equation (23). Knowing these constraints, the spline coefficient matrix [A] can then be calculated using equation (22).

This general approach can also apply to other spline types. However, according to this aspect of the invention, the particular constraints which are used for other spline types will be different, in order to achieve different spline behavior.

Figure 10:
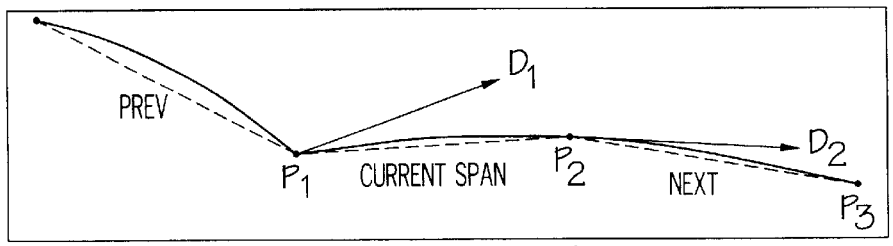
FIG. 10 shows an example of a "from stop" spline span type, which can be achieved according to principles of the present invention.

In particular, the "from stop" spline of this embodiment differs from the interior spline because the direction at the end of the previous span is irrelevant. For this spline type, discontinuities in the unit tangent vector between the previous span and the from stop spline will not result in velocity discontinuities, because a full stop occurs at the end of the previous span. In such a case, it would be undesirable to base the starting direction of the spline on the previous span's ending direction because the full stop indicates that the two spans are actually separate contours in the path. An example of a "from stop" spline is shown in FIG. 10.

In this embodiment, the constraints for the "from stop" spline are the same as that for the interior spline, except for $D_1$, the start of the spline direction. While technically D1 could be unconstrained in a starting from stop situation, experimentation has shown that good results can be achieved by setting this constraint to be equal to the tangent of the parabola used to estimate the span length. As noted with respect to step 234 of FIG. 2b, the span length can be estimated by fitting a parabola through the start of the current span, the end of the current span, and the end of the next span, and the length on the parabola from $P_1$ to $P_2$ is used to estimate the spline length. For the "from stop" spline, the constraint $D_1$ can be set equal to the tangent of this parabola at point $P_1$, by using the following equation:

$$D_1 = [R] \left\{ \begin{array}{c} \frac{1}{\sqrt{1+4a^2 x_1^2}} \\ \frac{2ax}{\sqrt{1+4a^2 x_1^2}} \end{array} \right\}, x_1 = L_1 \cos(2\theta + \phi) \quad (24)$$

Accordingly, equation (22) can be used to find the coefficient matrix [A] for the from stop spline, by using the same constraints for $P_1$, $P_2$, and $D_2$ as were used for the interior spline, and using equation (24) for the constraint $D_1$.

Figure 11:
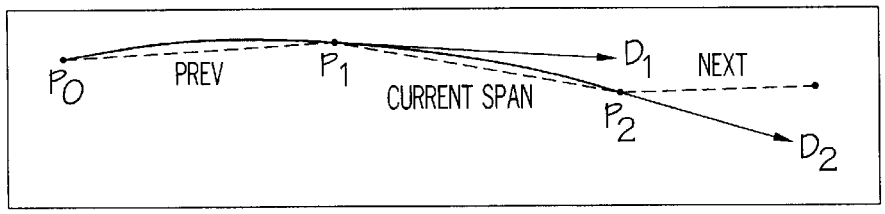
FIG. 11 illustrates an exemplary "to stop" spline motion control span, which can be obtained according to principles of the present invention.

Turning now to the "To Stop" type of spline, this spline type also calls for its own unique set of constraints. As shown in FIG. 11, the direction vector at the end of the "to stop" spline should not depend on the following span because continuous motion does not take place between these spans, but, rather, a full stop is commanded. In a case where a full stop is required, the direction of the next span is unrelated to the current span. Therefore, using the next span to determine a direction constraint for the end of the span could result in a span that deviates from the intended path. In FIG. 11, no span has been drawn for the next span, because its type and shape are irrelevant to the current span.

In this embodiment, the "to stop" spline uses the same set of constraints as the interior spline, with the exception of the end of span constraint, $D_2$. The first three constraints for the "to stop" spline are the start of span position $P_1$, end of span position $P_2$, and the start of span direction, which is the unit tangent vector at the end of the previous span. However, unlike the interior spline case, the direction at the end of the span, $D_2$, can be set equal to the tangent at point $P_2$ of the parabola which is fit through points $P_0$ (the start point of the previous span), $P_1$ (the start point of the current span), and $P_2$ (the end point of the current span). Since the next end of span position should not affect the current span in this case, according to an exemplary embodiment, it is not used in the parabola fit for estimating span length and $D_2$. Rather, the estimate S can be obtained by the parabola through $P_0$, $P_1$, and $P_2$ and the length is estimated by the length of this parabola from $P_1$ to $P_2$. Accordingly, $D_2$, in this case, can be calculated by the following equation:

$$D_2 = [R] \left\{ \begin{array}{c} \frac{1}{\sqrt{1+4a^2 x_3^2}} \\ \frac{2ax}{\sqrt{1+4a^2 x_3^2}} \end{array} \right\}, x_3 = L_2 \cos(\phi) \quad (25)$$

With these constraints, equation (22) can then be solved for the coefficient matrix [A] for this spline type. Thus, the difference between the "to stop" spline and the interior spline of this embodiment ties in how the span length S and the end of span direction constraint $D_2$ are computed.

Figure 12:
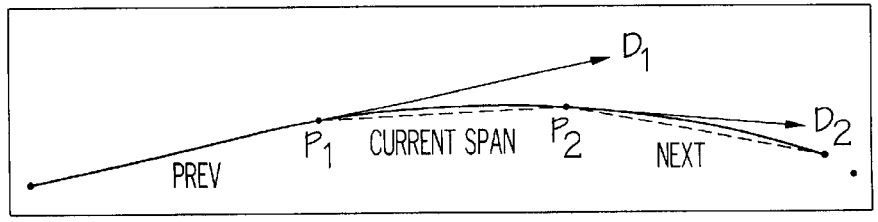
FIG. 12 is an example of a "from line" spline span type for a motion control path, such as can be obtained using the principles of the current invention.

Turning now to the "from line" spline type, this spline type provides for a smooth transition from a linear span to a spline span. As with the previous cases, the first two constraints can be the start of span position $P_1$ and the end of span position $P_2$. As with interior and "to stop" splines, the direction constraint at the start of the span, $D_1$, is the direction at the end of the previous span. In this case, $D_1$ is the tangent vector at the end of the linear span. The constraint for the end of the span, $D_2$, is computed, according to an exemplary embodiment, using the same technique as for the interior spline (i.e., using equation (23). Once these constraints are computed, the spline coefficient matrix can be determined in the same way as described for the other spline types (by using equation (22)). This approach provides for a transition from a linear to a spline span with a smoothly varying tangent vector (and continuous axis velocity), as shown in FIG. 12.

Although these constraints for the "from line" span help ensure that the tangent vector (direction) varies continuously and smoothly at the transition from linear to spline, the curvature vector may experience a discontinuity at the transition, which results in an acceleration discontinuity. Large acceleration discontinuities are avoided by step 228 of FIG. 2a, wherein the CDP is compared to a threshold, and the spline span is converted to a linear span (rather than becoming a "from line" span) when the threshold is exceed. A corner blend or full stop can be inserted between the two resulting linear spans. In this way, this embodiment avoids large discontinuities in curvature.

As noted above, this embodiment of the present invention utilizes the "From Circle" spline type for spline spans that are to transition from programmed circular spans. The coefficients for the "from circle" spline type can be determined in a manner identical to that of the "from line" spline. In particular, the circular span's end of span tangent vector provides the direction constraint $D_1$, and the direction constraint $D_2$ can be calculated using equation (23). The length of the spline span is determined by the length of the first segment of the parabola fit through points $P_1$, $P_2$, and $P_3$, and the spline coefficient matrix is then computed using equation (22). As discussed earlier, the "from circle" spline is not used in cases where there is a large direction change angle between the circular span's end of span tangent vector and the direction cosine for the current span's linear chord. Instead, the current span is converted to a linear span at step 229 of FIG. 2a.

Figure 13:
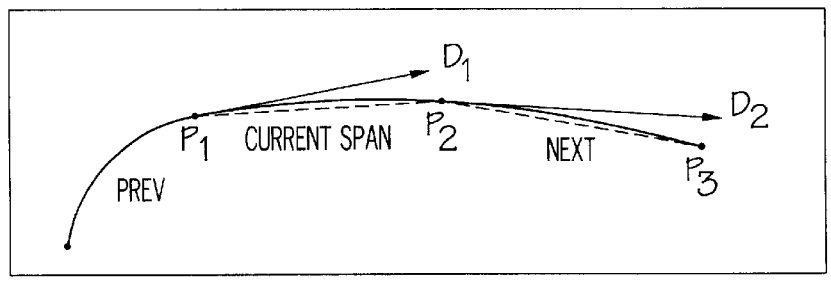
FIG. 13 shows an example of a "from circle" spline type, which can be produced according to principles of the present invention.

An example of the "from circle" spline span is illustrated in FIG. 13. It is evident from the figure that large curvature discontinuities, and consequently axis acceleration discontinuities, can occur at the transition between the circular arc and the spline. While the technique described above for deriving the coefficients for the "from circle" spline type does not differ from the "from line" spline type, in one embodiment, two separate types are maintained to allow for the possibility of treating the two cases differently to limit the magnitude of the curvature discontinuity that can occur in the circular case. One way of limiting this discontinuity, as described below, is to apply an end of span speed constraint for this type of spline.

Figure 14:
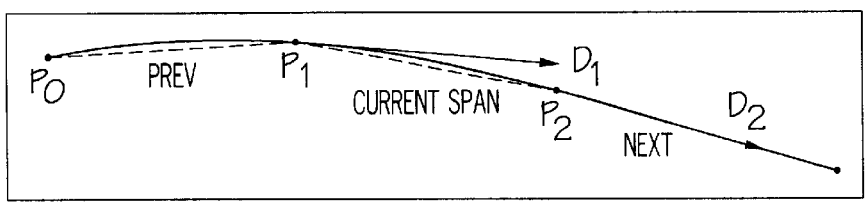
FIG. 14 illustrates an exemplary "to line" spline span type, which can be selected and obtained for a motion control path, according to principles of the present invention.

FIG. 14 illustrates an example of the "to line" spline type, which is used in this embodiment in the situation where a transition from one or more spline spans to a linear span is required. As with the transition from a linear span, a constraint of the direction at the transition is required. Furthermore, as described above, the smooth transition is generally only attempted when the change in direction between the spline span's linear chord and the linear span's direction cosine vector is within a predetermined range (i.e., the linear span's CDP is greater than the predefined threshold). As described above, a spline span that cannot transition to a linear span because of a large change in direction is designated as a "to stop" spline, and a full stop is inserted after this span.

For the "to line" span of this embodiment, the end point of the next span should not affect the formulation of the spline span. For this reason, the estimate of the span length is based on a parabola fit through $P_0$, $P_1$, and $P_2$, and the estimate S of the span length is the length along this parabola from point $P_1$ to point $P_2$. Thus, for the "to line" spline type of this embodiment, the four constraints are as follows: 1) $P_1$ is the start position of the current span ($P_1$), 2) $P_2$ is the end position of the current span ($P_2$), 3) $D_1$ is equal to the unit tangent vector at the end of the previous span, and 4) $D_2$ is set equal to the direction of the linear span (the start of span direction cosine vector for the linear span). Using these constraints, the equation for the spline coefficient matrix [A] can be calculated using equation (22).

Figure 15:
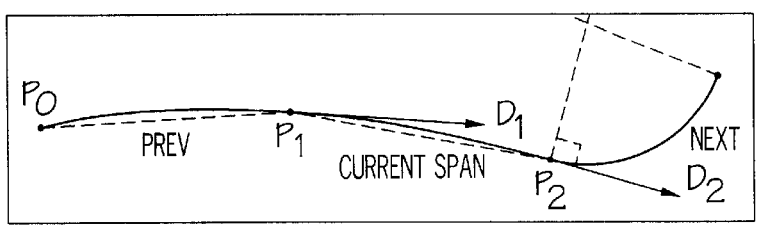
FIG. 15 shows an example of a "to circle" spline span type, which can be obtained by an embodiment of the motion control system and method of the present invention.

The spline type "to circle" of this embodiment is illustrated in FIG. 15. This type of spline is used when transitioning from a sequence of spline spans to a programmed circular span. This case is treated identically as the "to line" case in this embodiment. However, in this case, undesirable discontinuity in curvature can result. Thus, this case is separated from the "to line" spline case to allow for a reduction in this curvature discontinuity if desired. For example, the discontinuity can be handled by setting an end of span speed constraint based upon the spline span's ending curvature and the circular span's starting curvature, to ensure that the axis jerk at the transition is within configured maximum values. Alternatively, to obtain continuity in curvature, a fourth order spline could be utilized for this case.

Figure 16:
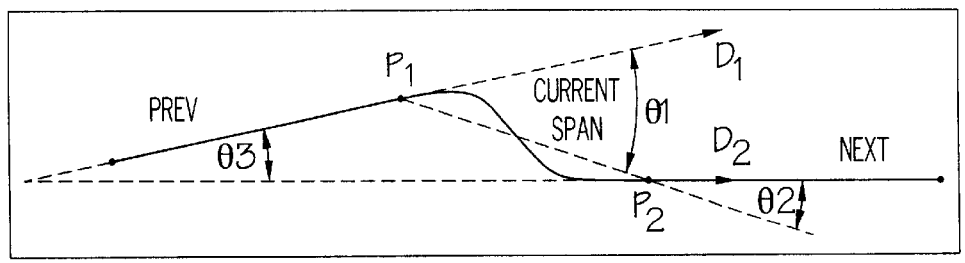
FIG. 16 illustrates an example of a "between" type of spline span, which can be used according to motion control principles of the present invention.

A case may arise where a span is designated as a spline type and the previous and next span are either circular or linear or a combination of circular and linear. Such a case is not expected often, but it may be useful to use spline interpolation to transition smoothly between the spans without slowing down to meet a velocity constraint. A spline which has a non-spline previous and next span is referred to herein as a "between" spline, and an example of such a spline is shown in FIG. 16. Such a spline may be inserted automatically in situations where one or both its adjacent spans were programmed as spline mode (i.e., G5.1), but were reassigned as linear by the algorithm. Alternatively, a between spline span may be inserted intentionally by the part program developer to achieve a smooth transition from one contour to another.

As noted above, a between spline is typically used only if certain geometric conditions are met. As in the case of the "to line", "to circle", "from line" and "from circle" spline types, the algorithm of FIG. 2 converts the spline span to linear if the CDP's associated with the transitions are below the specified threshold. In other words, with respect to FIG. 16, the algorithm re-assigns a potential "between" spline span as a linear span if either $\theta_1$ or $\theta_2$ are too large. Rather than using a parabola to estimate length, the between spline span uses the length of the linear chord for the span as the path length. However, this procedure will provide a good estimate of span length if $\theta_3$ is relatively small. According to one embodiment of the present invention, the threshold for the maximum value of $\theta_3$ can be less than or equal to the thresholds used for the maximum values of $\theta_1$ and $\theta_2$. This comparison can be accomplished by computing a CDP for the between span according to the following equation (which computes the cosine of $\theta_3$) and checking to ensure that this CDP is greater than a CDP threshold:

$$CDP_3 = \cos(\theta_3) = (prev \to \overrightarrow{eos\_tan\_vec}) \cdot (next \to \overrightarrow{sos\_dir\_cos}) = \overrightarrow{D_1} \cdot \overrightarrow{D_2}$$

The CDP threshold can be the lesser of the CDP threshold for the current span and the CDP threshold for the next span. If the CDP for $\theta_3$ falls below this threshold, the span will be converted to a linear span.

According to an exemplary embodiment, the constraints for the between span are as follows:

P1 is the position at the start of the span, P2 is the position at the end of the span, D1 is the direction cosine vector at the end of the previous span, and D2 is the direction cosine vector at the start of the next span. As mentioned, S is approximated by the length of the span's linear chord. Knowing these variables, the equation for the coefficient matrix [A] can be calculated, according to equation (22).

Returning to FIG. 2b, once the coefficient matrix for the particular spline type is calculated at step 236, the process proceeds to step 238, where constraint vectors for the span are computed, according to another aspect of the invention. In this embodiment, constraint vectors are used to compute the maximum path speed, maximum path acceleration, maximum path jerk, and a speed constraint for the end of the span. The following describes how each of these vectors can be computed for a third order polynomial spline span.

In this embodiment, the following values are computed for each spline span
the direction cosines vector for the start of the next span
the direction cosines vector for the end of current span
the curvature at the start of the next span
the curvature at the end of the current span These values are then used to compute an end of span speed constraint (eossc) to constrain the speed at the end of the span, as limited by the maximum step acceleration and maximum step velocity which are configured by the user. In this way, it is ensured that maximum step velocities, maximum step accelerations, and maximum jerks are not exceeded. When a smooth transition is used from one spline span to the other or between a spline and non spline span according to an exemplary embodiment of the present invention, the step velocity will be zero and the sos and eos direction cosines will not contribute toward the speed constraint. Thus, the sos and eos direction cosines only contribute to the constraint for non-spline situations. This is one of the advantages of the spline interpolation method and system of this exemplary embodiment.

In this embodiment, the start of span direction cosines vector for the next span can be copied from the D1 term calculated in step 236 when computing the spline span coefficient matrix. An alternative solution would be to compute the tangent to the spline curve at the start of the span by differentiating the spline polynomial with respect to the path distance parameter u, and substituting u=0. The end of span direction cosines vector for the spline span can be copied from the variable D2, which was used to compute the spline coefficient matrix in step 236. An alternative solution would be to compute the tangent to the spline curve at the end of the span by differentiating the spline polynomial with respect to the path distance parameter u, and substituting u=span length S.

The direction cosines at the end of a first span and the direction cosines at the start of a second adjacent span can be used to assign the end of span speed constraint at the end of the first span. The constraint is assigned in such a way that no axis experiences a step change in velocity that is greater than the configured maximum step-velocity for that axis. If the direction cosines at the end of the first span is the same as the direction cosines at the start of the second span, then there is no constraint because no axis will experience a step change in velocity, one of the benefits of this embodiment. Thus, the sharper the corner, as defined by the direction cosines, the more the machine is forced to slow down.

The span's start of span curvature vector can be computed by taking the second derivative of the spline polynomial with respect to the distance along the curve parameter and evaluating the second derivative at path distance equal to zero (i.e., u=0). Thus, the curvature vector can be derived as follows:

$$\{K\} = \frac{d^2}{du^2}([A]\{u^3 \; u^2 \; u \; 1\}^T) \tag{26}$$

Evaluation of the derivative yields the following general expression for curvature at any point along the curve:

$$\{K(u)\} = [A]\{6u \; 2 \; 0 \; 0\} \tag{27}$$

As can be understood, the start of span curvature is the curvature vector evaluated at u=0.

$$\begin{Bmatrix} K_X \\ K_Y \\ K_Z \end{Bmatrix}_{SOS} = \begin{Bmatrix} K_X(u=0) \\ K_Y(u=0) \\ K_Z(u=0) \end{Bmatrix} = \begin{Bmatrix} 2A_{1,2} \\ 2A_{2,2} \\ 2A_{2,3} \end{Bmatrix} \tag{28}$$

In practice, the start of span curvature data item can be an array of more than 3 elements, one for each machine tool logical axis. For a spline span, all the array elements except for three are zero, the three nonzero elements corresponding to the three axes that define the spline Cartesian coordinate system for the span.

Then span curvature for the end of the current span can be computed by evaluating equation (28) at the end of the current span, (i.e., at u=S), as shown in the following equation:

$$\begin{Bmatrix} K_X \\ K_Y \\ K_Z \end{Bmatrix}_{EOS} = \begin{Bmatrix} K_X(u=S) \\ K_Y(u=S) \\ K_Z(u=S) \end{Bmatrix} = \begin{Bmatrix} 6SA_{1,1} + 2A_{1,2} \\ 6SA_{2,1} + 2A_{2,2} \\ 6SA_{3,1} + 2A_{2,3} \end{Bmatrix} \tag{29}$$

The curvature vector at the end of a first span and the start of a second span are also used in this embodiment to assign an end of span speed constraint at the end of the first span. The end of span speed constraint can be assigned in such a way that no axis experiences a step change in acceleration that is greater than the configured maximum step-acceleration for the axis. The maximum step acceleration for an axis may be related to the axis' maximum jerk by considering the jerk experienced by a step acceleration in a single interpolation time interval. Thus, the greater the curvature, the more the machine is forced to slow down.

In addition to the end of span speed constraint, in one embodiment, the speed, acceleration, and jerk across the entire span be constrained. In particular, in this embodiment, a maximum tangent vector component for each axis can be computed for the spline span, and this can be used to determine the following: 1) a maximum velocity for the span, as constrained by the configured maximum path speed and configured maximum axis velocities, 2) the span's maximum acceleration, as constrained by the configured maximum path acceleration and configured maximum axis acceleration, 3) the span's maximum jerk, as constrained by the configured maximum path jerk and maximum axis jerks.

In this embodiment, each component of the maximum tangent vector (i.e. x, y, and z) is the maximum of the absolute value of the following quantities.

the start of span direction cosine vector component the end of span direction cosine vector component the absolute value of the tangent vector component at the location where the tangent vector component is extremized This can be represented by the following equation for the X-axis component of maximum tangent for a span, where analogous equations are used for the other components.

$$\max\_\tan_X = \max\left(|sos\_dir\_cos|, |eos\_dir\_cos|, \left|\frac{dX}{du}\right|_{u=u_e}\right) \tag{30}$$

In the previous equation, $u_e$ represents the location along the span where the (in this case X) component unit tangent vector is extremized. For a cubic spline polynomial, there is only one location where the unit tangent vector component is extremized. This location may or may not be on the span. Only locations where the extremum occurs on the span, (i.e., $0 < u_e < S$) are considered in equation (30).

The locations where a unit tangent vector component is extremized can be determined by finding the roots of the derivative of the same component's unit tangent vector:

$$\frac{d}{du}([A]\{3u^2 \; 2u \; 1 \; 0\}^T) = \{0 \; 0 \; 0\}^T \tag{31}$$

Evaluation of the derivative in the previous equation yields the following three independent equations for each of the three components (1, 2, and 3 corresponding to the Cartesian system's perpendicular axes—for example x, y, z).

$$\begin{Bmatrix} 6A_{1,1}u_{e1} + 2A_{1,2} \\ 6A_{2,1}u_{e2} + 2A_{2,2} \\ 6A_{3,1}u_{e3} + 2A_{3,2} \end{Bmatrix} = \begin{Bmatrix} 0 \\ 0 \\ 0 \end{Bmatrix} \tag{32}$$

and this equation has the following solutions.

$$\begin{Bmatrix} u_{e1} \\ u_{e2} \\ u_{e3} \end{Bmatrix} = \begin{Bmatrix} -A_{1,2}/3A_{1,1} \\ -A_{2,2}/3A_{2,1} \\ -A_{3,2}/3A_{3,1} \end{Bmatrix} \quad (33)$$

The nth-component of the unit tangent vector is evaluated at the location $u_{en}$, only for cases where $u_{en}$ occurs on the span. If $u_{en}$ does not occur on the span, then it is not included in equation (30). It can be determined whether the $u_{en}$ occurs on the span if the value for $u_{en}$ is greater than zero but less than the span length.

The maximum tangent vector can be used to limit the span's maximum velocity, in addition to other possible limiting factors. The maximum tangent vector component represents the case where an axis instantaneously moves the furthest distance for a given move in distance along the span. A maximum velocity for an axis can be calculated using the maximum tangent vector. For example, the X-axis component of the maximum tangent vector is a factor that, when multiplied by span velocity provides the maximum axis velocity experienced during the span. The span maximum velocity is then limited according to the maximum tangent by preventing the X-axis from exceeding that maximum axis velocity which was calculated. (Other factors may also be used to determine other maximum span velocity candidates, and the lowest of these will be used to limit the span velocity.) Accordingly, by limiting span velocity using the maximum tangent vector, one or more axes experience its maximum axis velocity, but no axis velocity exceeds its maximum velocity.

The maximum tangent vector can be used to limit span acceleration in an analogous way. A maximum acceleration as limited by the maximum tangent vector is the acceleration during the span that will cause one or more axes to experience it maximum axis acceleration capability, but causes no axis to exceed it maximum capability. Thus, the maximum tangent is used to limit the path acceleration achieved during the span to ensure that no axis moves with an acceleration beyond it capability. Other maximum acceleration candidates can also be calculated for the span using other factors, and the lowest of these maximums should be used for the span's maximum acceleration.

In addition, the maximum tangent vector can be used to limit the maximum jerk for the span, in a similar manner. The span's maximum jerk as limited by the maximum tangent vector is the path jerk during the span that will cause one or more axes to experience it s maximum jerk capability, but also causes no axis to exceed its maximum jerk capability. Other maximum jerks can also be calculated for the span using other factors, and the lowest of these maximum jerks can be used to limit the span's jerk.

In addition to limiting the maximum span velocity based upon the maximum tangent vector, according to one aspect of the invention, candidates for the maximum span velocity can be calculated using a maximum curvature vector, as well as a maximum change in curvature vector. In particular, in this embodiment, the maximum curvature vector is used to determine the maximum velocity over the span, as limited by the configured maximum axis accelerations. Each component (e.g., X, Y, Z) of the maximum curvature vector in this embodiment is defined as the largest of the following quantities for the span:

the absolute value of the curvature component at the start of the span the absolute value of the curvature component at the end of the span the absolute value of the curvature component at locations on the span where the curvature component reaches an extreme value, (i.e., a local maximum or a local minimum).

For a cubic polynomial, which is used for spline spans in one embodiment, each axis' component of curvature varies linearly between the start of the span and the end of the span. Accordingly, there is no location on the span where the curvature component experiences a local minimum or local maximum. Thus, in the case of a cubic spline, the maximum curvature is the larger of the start of span curvature (sos_curv) and the end of span curvature (eos_curv). For the X-axis component of the maximum curvature vector, this can be represented by the following equation:

$$\text{max\_curv}_x = \max(|\text{sos\_curv}|, |\text{eos\_curv}|) \quad (34)$$

Analogous equations can be used for the other axis components of the curvature vector.

Once calculated, the maximum curvature vector can be used to limit the velocity during the span such that no axis accelerates beyond its capability. It can be used to develop one of a plurality of candidate values for the maximum velocity. The candidate for maximum velocity that is derived from maximum curvature is the path velocity that causes one or more axes to experience its maximum acceleration during the span, but causes no axis to exceed its maximum acceleration.

In this embodiment, a maximum change in curvature vector is also used to define a candidate for the span's maximum velocity, such that the individual axes' configured maximum jerks are not exceeded. The maximum change in curvature vector is the vector whose components are the maximum absolute values of the change in curvature components over the span. The change in curvature at any point on the span can be computed by differentiating the curvature with respect to distance along the path:

$$\{\text{dcurv\_ds}(u)\} = \frac{d}{du}([A]\{6u\ 2\ 0\ 0\}^T) \quad (35)$$

Evaluation of the Derivative Yields the Expression.

$$\begin{Bmatrix} \text{dcurv\_ds}_1 \\ \text{dcurv\_ds}_2 \\ \text{dcurv\_ds}_3 \end{Bmatrix} = \begin{Bmatrix} 6A_{1,1} \\ 6A_{2,1} \\ 6A_{3,1} \end{Bmatrix} \quad (36)$$

The previous equation indicates that, for a cubic spline span, the change in curvature is constant over the entire span. Thus, in this embodiment, the maximum absolute value of the dcurv_ds components is simply the absolute value of equation (36).

This maximum change in curvature vector can then be used to derive a candidate for the maximum span velocity. The span maximum velocity based upon maximum change in curvature is the path velocity that causes one or more axes to experience maximum jerk during the span, but causes no axis to exceed its maximum jerk.

Once the spline span's length, coefficient matrix, and constraint vectors are computed (steps 234, 236, and 238 of FIG. 2), the span execution data to be used by the interpolator is updated, at step 240, to allow for actual movement according to the spline spans. As known in the art, on a digitally controlled CNC, a spline span can be interpolated at regular time intervals by an interpolator (which can be incorporated in the position command generator 32 of FIG.

1) in such a way as to achieve a desired velocity along the path (i.e., path speed or feedrate).

The span execution data should be modified to suit the particular implementation of the interpolator. For example, in this embodiment, the interpolator should be informed that the path type of the span is a cubic polynomial, and that the span involves programmable motion on all three of the axes associated with the spline coordinate system. In addition, the span end point should be converted to interpolation units, and the interpolator should be informed of the mapping from the spline Cartesian coordinate system to the machine tool's logical axis system. Additionally, the spline coefficient matrix should have its elements converted to interpolation units, to represent the number of engineering linear displacement units (mm) per linear interpolation unit.

In an exemplary embodiment, the interpolation process also includes the use of a velocity manager that operates on a span length quantity whose value is reduced as span length is "consumed" during the interpolation process. Because the spline polynomial is parameterized with respect to distance from the start of the span in this embodiment, the span length should be defined to allow the spline interpolator to determined the distance from the start of the span at every time interval.

In this embodiment, the tasks which pertain to interpolation of polynomial splines in the discrete time digital controller are 1) the velocity manager determines the instantaneous feedrate desired for the current time interval, uses this value to determine the required incremental motion along the span during the current time interval, and updates the distance along the span s(t) defining the next required interpolation point, 2) the spline interpolator operates on s(t) as the parameter in the spline polynomial to determine the axis command positions for the current time interval of the digital controller. The interpolator evaluates the third order polynomial based on the span data representing the coefficient matrix A:

$$\begin{Bmatrix} x(t) \\ y(t) \\ z(t) \end{Bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix} \begin{Bmatrix} s(t)^3 \\ s(t)^2 \\ s(t) \\ 1 \end{Bmatrix} \quad (37)$$

This matrix equation is most efficiently evaluated using the following equations. In these equations, the quantity s expresses distance in interpolation units:

$x = ((a_{11}s + a_{12})s + a_{13})s + a_{14}$ $y = ((a_{21}s + a_{22})s + a_{23})s + a_{24}$ $z = ((a_{31}s + a_{32})s + a_{33})s + a_{34}$

As seen, 3 multiplies and 3 adds per axis per time interval are required, so that a total of 9 multiplies and 9 adds are required. This is two fewer multiples than is required if Equation (37) is directly evaluated.

The velocity manager can run in real time in advance of the interpolation algorithm. Its main purpose is to decide how much distance to move along the path during the given interpolation processing interval. It is often required to change the velocity that is experienced during the interval such that the maximum path acceleration and jerk for the span is not exceeded. With reference to FIG. 1, the velocity manager can be part of the position command generator 32.

In one embodiment, the spline stage operates by preparing span's in stages. In general, a span is said to have completed preparation once all the stages of preparation have been experienced by the span. Typically, each stage requires information from upcoming future spans (i.e. next, last, etc).

To be useful, the upcoming span should complete processing through each stage in the sequence of stages up to the stage operating on the current span. Since earlier stages may also require data from upcoming span's to complete processing of a current span, it is often necessary to look ahead several spans at each stage. For example, stage3 may be trying to complete its processing of span11, and requires that span12 and span13 have undergone processing through stage2. Meanwhile, stage2 may require 2 lookahead spans to complete its processing, and span13 requires that span14 and span15 have undergone stage processing through stage1.

Preparation of span's in stages can have the advantage of allowing multiple capabilities to affect the span sequentially. It can also have the advantage of allowing the capability of being added or removed from the control without changing the behavior of other capabilities.

The stage processing method can have an inherent requirement that spans only look ahead to make decisions as previous spans will potentially have modifications to data that were applied by later stages that have not yet operated on the current span. An additional area of complexity can be associated with a need to convert both spans that form a sharp corner from linear to spline spans, and to have the spline span that precedes the first linear span be that of type to line. Other similar situations can be, for example, those related to combinations of flats and sharp corners.

Figure 17:
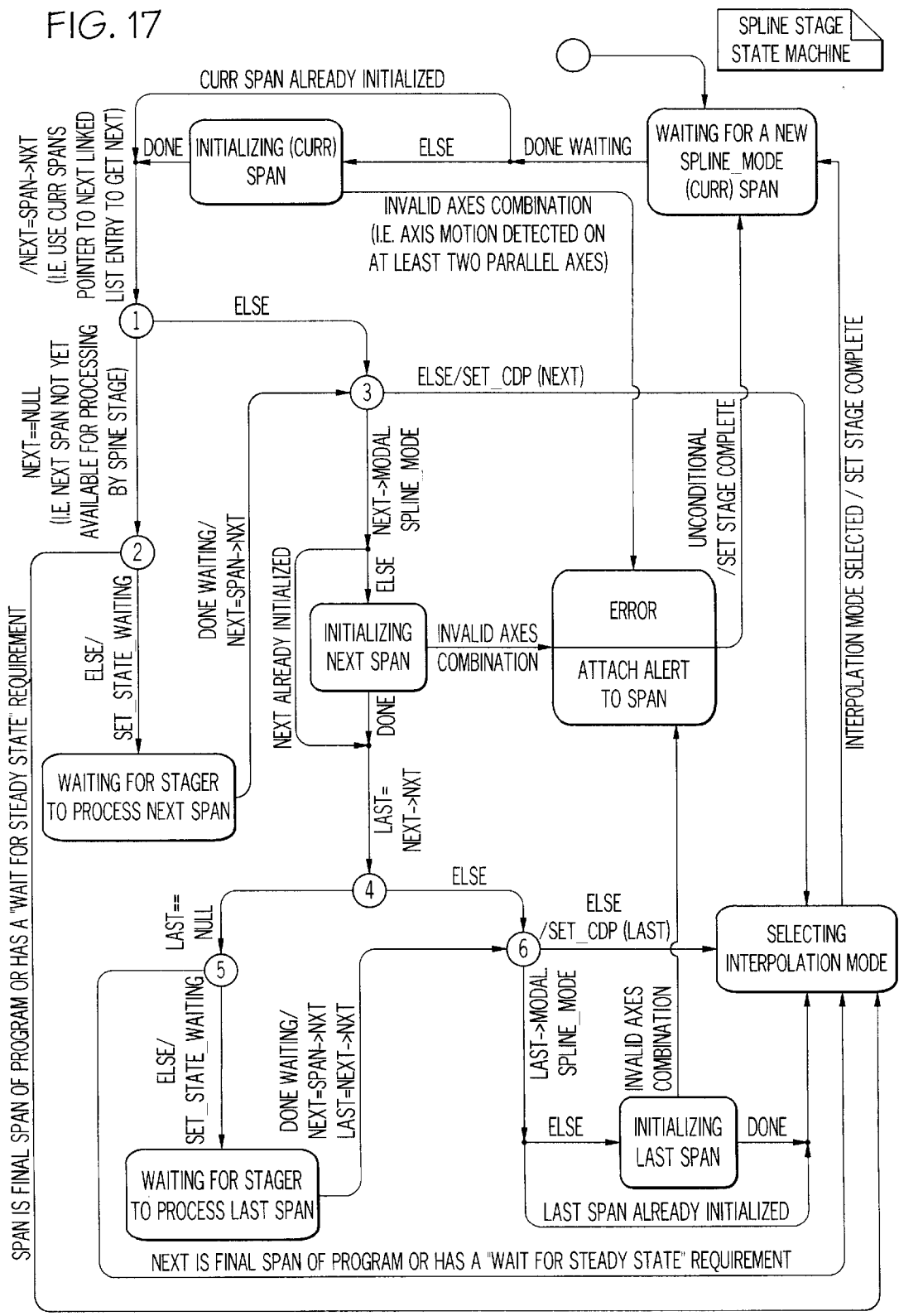
FIG. 17 is a finite state machine diagram illustrating the operation of a spline stage motion control program, according to one embodiment of the present invention.
Figure 18:
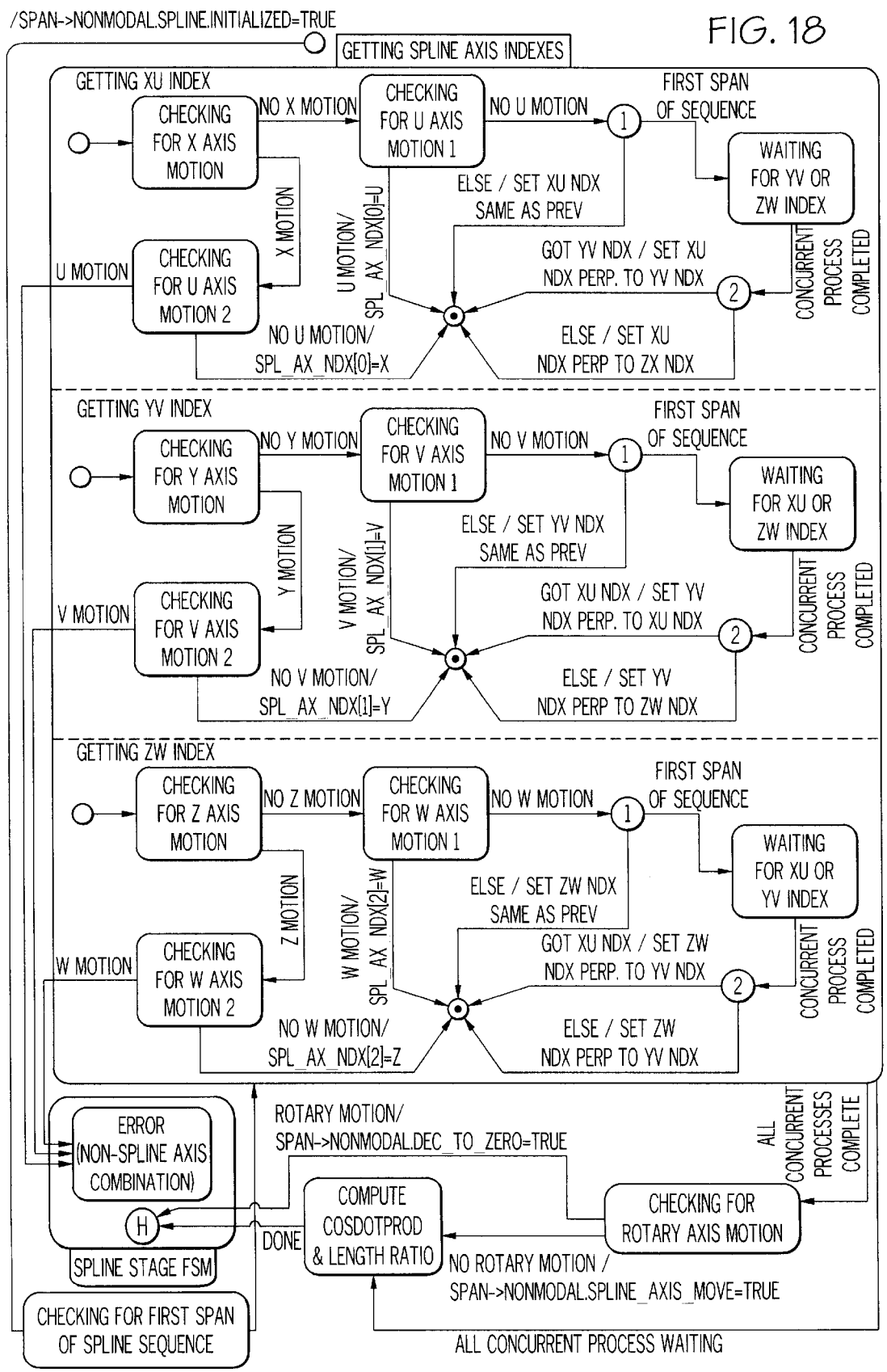
FIG. 18 is a finite state machine diagram illustrating an embodiment of span initialization algorithm, which operates according to principles of the present invention, and which can be used with the program of FIG. 17.
Figure 19A:
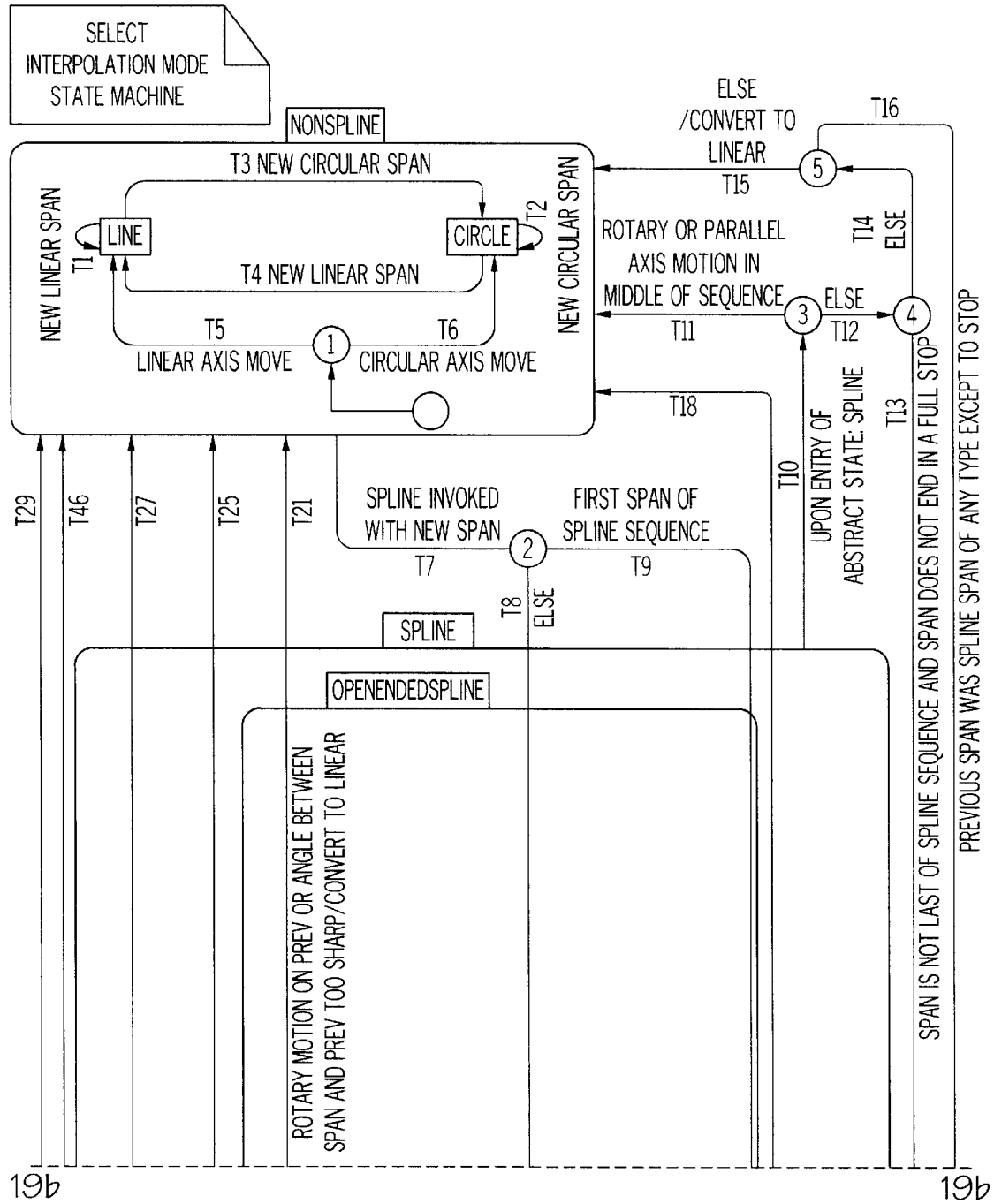
FIG. 19 is a finite state machine diagram illustrating an embodiment of an interpolation mode selection algorithm, which operated according to principles of the present invention, and which can be used with the algorithms of FIGS. 18 and 19.
Figure 19B:
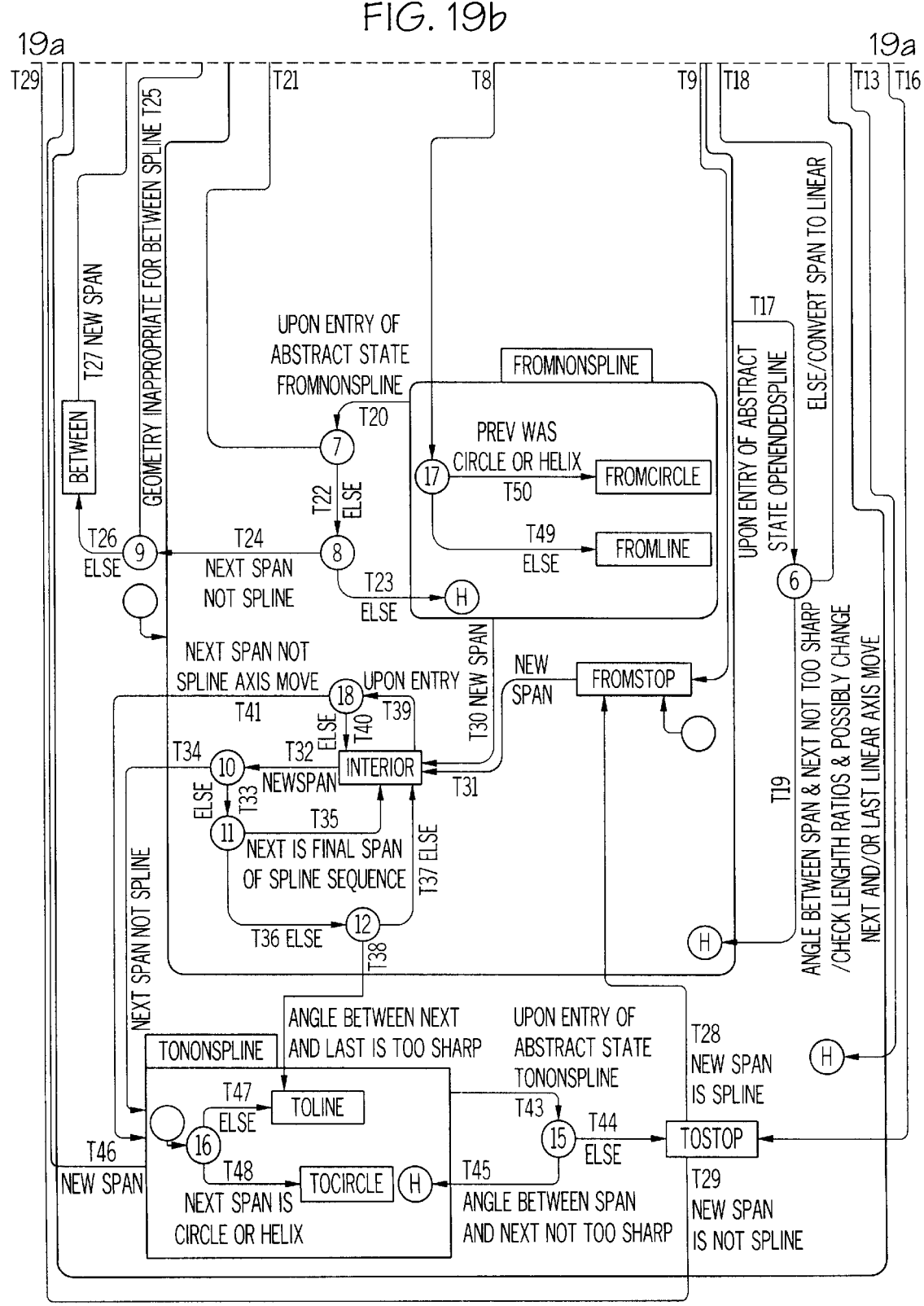

An embodiment of the present invention directed to addressing such issues is described below with respect to FIGS. 17–19, which utilize finite state machine (FSM) diagrams. FIG. 17 is an exemplary FSM diagram showing an exemplary spline stage control algorithm according to this embodiment. Meanwhile, FIG. 18 is an FSM diagram illustrating an exemplary spline span initialization algorithm according to this embodiment, and FIG. 19 is an FSM diagram illustrating an exemplary spline mode selection algorithm according to this embodiment. These algorithms can operate in a context similar to that of FIG. 1, and can use the various spline types shown and discussed with respect to FIGS. 3–16.

In one embodiment, and as noted above, spline interpolation according to principles of the present invention is carried out in a spline stage of the motion controller. The main function of the spline stage is to determine whether or not a modal linear (G1) span in a program section that is designated as spline mode active should be defined as a nonmodal spline interpolation span or whether it should be re-defined as a nonmodal linear interpolation span. If it is defined as a nonmodal spline span, the spline stage should determine the type of spline span. The type of spline span depends on the context and may be one of a number of different types to be described shortly.

In order to make these decisions the spline stage requires access to span data from the previous span (shorthand: prev), span data from the next span (shorthand: next), and span data from the next span's next span (shorthand: last). The current span (shorthand: span or curr) is the span which is currently being prepared for completion by the spline stage. The prev span has completed all stage processing including computation of rates constraints and generation of the Span Execution span data.

If not NULL, the curr, next, and last spans have completed all stage processing up to the spline stage. Treating them as linear interpolation throughout the stages from initial calculations up until Spline generated the nonmodal data for these spans. The span is redefined as a nonmodal spline span the first time the spline stage is invoked with the span in question being non-NULL, i.e., having completed the stages up to spline.

In this embodiment, the spline stage defines the spline type as one of the following.

SP_SPLINE_INTERIOR—A spline span where the previous and the next span are also both spline spans and arc joined to these adjacent spans with coincident unit tangent vectors at each boundary.

SP_SPLINE_TO_STOP—A spline span that is the final spline of a sequence. The geometry of the span is determined without using any information from the next or last span. A dec_to_zero condition is imposed on the span.

SP_SPLINE_FROM_STOP—A spline span that is the first of a spline sequence or group. The geometry of the span is determined without using any information from the prev span.

SP_SPLINE_FROM_LINE—A spline span whose unit tangent vector at the start of span is coincident with the unit tangent vector of the linear span.

SP_SPLINE_FROM_CIRCLE—A spline span whose unit tangent vector at the start of span is coincident with the unit tangent vector at the end of the circular span.

SP_SPLINE_TO_LINE—A spline span which, at the end of span, transitions into a linear span with a unit tangent vector which is coincident with the unit tangent vector of the linear span.

SP_SPLINE_TO_CIRCLE—A spline span which, at the end of span, transitions into a circular or helical span with a unit tangent vector which is coincident with the unit tangent vector at the start of the circular span.

SP_SPLINE_BETWEEN—A spline span where the prev and next spans are both non-spline, i.e., linear or circular or helical. Certain geometric conditions should exist for this type of span to be inserted. The transition at the start of span and end of span contain unit tangent vectors that are equal to the unit tangent vectors of the non-spline spans at the transition points.

The finite state machine (FSM) diagram shown in FIG. 17 describes the spline stage. In the figure, the initializing span states involve a process of determining the indexes of the axes in motion and verifying that the indexes are a valid combination. The initialize span states also include the process of changing the nonmodal move type from its initial value of linear to spline, and computes two span data items: CosineDotProduct (CDP) and LengthRatio (LR). The primary activity of the state: selecting interpolation mode is to determine whether the span should be interpolated as a spline or a line, and if it is spline, to select the type of spline. More detailed descriptions of the activities of the states: initializing span and selecting interpolation mode is described in the following sections.

In some cases, if the next or last span has not yet been created and processed through the stages prior to spline, then the spline stage lets the stage processor know that it requires an additional span. This is indicated in the FSM diagram by the states: Waiting for Stager to Process (next/last) Span. There are several cases where the spline stage does not use or require the next and/or last span in this embodiment. These are listed below.

The next span is not prepared if the curr span has a wait for steady state requirement (i.e. stop lookahead to allow real time span execution to catch up with lookahead to allow for decision making based on real time events) condition or is the last span of the program. In this case, the curr span is the last span of the spline sequence, its type is defined as a spline_to_stop, and the spline stage processing of the span is completed.

The last span is not prepared if the next span has a wait for steady state (i.e. stop lookahead) condition or is the last span of the program. In this case, the curr span type is determined based on the context, and the spline stage processing of the curr span is completed.

The last span is not prepared if the next span is not a modal spline_mode span. In this case, the curr span is defined as the type spline_to_line or spline_to_circle assuming the change in angle between spline span's chord and the non-spline span's start of span direction is not sharper than the angle threshold.

In this embodiment, the spline-stage state machine can be reset by a spline public function that is called for every invocation of stager-reset. The spline reset function initializes the stage state to the state Waiting-For-New-Spline-Span and the active span is identified as the last span of a spline sequence. The reset function also initializes the spline axis indexes to their configured default values.

The process of selecting the axis indexes for the spline span is described by the "getting spline axis indexes state" of the span initialization FSM embodiment of FIG. 18. In this embodiment, the spline spans require that three axis indexes to represent the three dimensions of the Cartesian system be identified. In this embodiment, a span execution program always interpolates spline spans with the potential for all three axes to experience motion even if the axis would not have experienced motion if the span were linear. The spline span initialization program of FIG. 18 allows for any three non-parallel linear axes to define the Cartesian space. The three dimensional Cartesian system is identified by the three element span->modal.spl_ax_ndx[ ] array. The dimensions are specified using the following symbols.

SP_SPL_XU_DIM=0
SP_SPL_YV_DIM=1
SP_SPL_ZW_DIM=2

Each of the array elements for defining the Cartesian coordinate system may take on one of two values as shown below.

span->modal.spl_ax_ndx[SP_SPL_XU_DIM]= NCE_LOG_X_AXIS (0) or NCE_LOG_U_AXIS (3);

span->modal.spl_ax_ndx[SP_SPL_YV_DIM]= NCE_LOG_Y_AXIS (1) or NCE_LOG_V_AXIS (4);

span->modal.spl_ax_ndx[SP_SPL_ZW_DIM]= NCE_LOG_Z_AXIS (2) or NCE_LOG_W_AXIS (5);

In this embodiment, axes indexes are selected based on which axes would experience motion if the span were interpolated as a straight line. If the span's linear chord would involve motion of more than one parallel axis, the axes are decelerated smoothly to a stop, prepared data is aborted, and a data reset is executed. Alternatively, the span can be interpolated linearly and again test for a valid Cartesian coordinate system when the next span is processed.

The mechanism for selecting the axis indexes is a FSM with three concurrent processes: one for each dimension of the spline Cartesian space. Although the processes are modeled as concurrent, the actual execution can use pseudo-concurrent threads with order of priority: 1) getting XU index, 2) getting YV index, 3) getting ZW index. In cases where straight-line motion is detected in fewer than three dimensions, the axis index is determined from the corresponding dimension from the previous span. In cases where: 1) straight-line motion is detected in fewer than three axes, and 2) the span is the first span of a new spline sequence or group, the index of the non-motion axis (axes) is determined based on the index of one of the axes that does experience motion when interpolating along the span's straight line chord. The index of the non-motion axis corresponds to the default perpendicular axis in the dimension that contains an axis that does involve motion when interpolating along the straight-line chord. The dimension to which the non-motion dimension is compared can be selected based on the following order of priority: XU, YV, or WZ. The default parallel systems are XYZ and UVW. As an example, the following snippet of G-code demonstrates a case where the first span of a spline sequence 1) does not involve any motion when interpolating along the chord, and 2) involves a non-default Cartesian system. The C-code snippet that follows the G-code snippet demonstrates how parallel axes can be selected in this case.

```
G1 G9 X10 Y10 Z10 U10 V10 W10
G5.1 G1 X10 Y20 Z10 U10 V10 W20
span->modal.spl_ax_ndx[SP_SPL_YV_DIM]=
    NCE_LOG_Y_AXIS;
span->modal.spl_ax_ndx[SP_SPL_XU_DIM]=span-
    >modal.spl_ax_ndx[SP_SPL_YV_DIM]+SP_
    SPL_XU_DIM-SP_SPL_YV_DIM;
span->modal.spl_ax_ndx[SP_SPL_ZW_DIM]=
    NCE_LOG_W_AXIS;
```

The C-code snippet indicates that the XU dimension is defined as the X-axis because the YV dimension has been defined to have higher precedence than the ZW dimension. If the precedence were reversed, then the X dimension would have been defined as the U axis because it is the default parallel axis to W.

The previous example reveals a potential problem. If the first spline span were part of a sequence where motion on the U axis is programmed in subsequent spans and X-axis motion was never intended, then the spline sequence would eventually be broken at some point. This would result in one or more spans being interpolated as linear interpolation spans with full stops at the end of span. It is expected that this problem will be extremely rare and is not very severe.

Lookahead is not used to overcome this problem, because guaranteeing that the next span be available for determining the axis indexes would require providing the potential to look ahead an unlimited number of spans. This shortcoming can be worked around by always programming motion in the first span of a sequence of spline spans that exist in a non-default Cartesian coordinate system. A solution that should make the problem even rarer is to allow the default coordinate systems to be configured to be something other than XYZ and UVW, e.g., XVZ and UYW. This would allow the developer to configure the default system for a particular machine configuration.

The configuration item can be a three-element array to designate the default system. The secondary system is always the conjugate of the default system. The default system can be called spline_default_sys and the secondary system can be derived from the default system as follows:

```
spline_default_sys[SP_SPL_XU_DIM]=NCE_
    LOG_X_AXIS or NCE_LOG_U_AXIS
spline_default_sys[SP_SPL_YV_DIM]=NCE_
    LOG_Y_AXIS or NCE_LOG_V_AXIS
spline_default_sys[SP_SPL_ZW_DIM]=NCE_
    LOG_Z_AXIS or NCE_LOG_W_AXIS
```

The length ratio can be designated as the span data item span->nonmodal.length_ratio, and is denoted using the shorthand LR. It is the ratio of the greater of the linear chord lengths to the lesser of the linear chord lengths of a span and its previous span. The length ratio for a span is computed in the final step of the initialization of that span. In this embodiment, length ratio cannot be computed before this time because the computation requires knowledge of the spline axis indexes. Typically, length ratio is only meaningful for a set of spans that involve motion in the same three-dimensional Cartesian coordinate system. The finite state machine of this embodiment will not consider the length ratio between two spans that exist in different Cartesian systems.

In this embodiment, the length ratio is used to determine when a flat (linear) span is required rather than a smooth curve. Within a spline sequence composed of approximately equal length short spans, if the length ratio is greater than the value of the current span's modal.spline_max_length_ratio, then the longer of the two spans is interpreted as a linear span and the shorter span is interpreted as a transition between spline and linear interpolation.

$$LR_{CURR} = \frac{\max(L_{CURR}, L_{PREV})}{\min(L_{CURR}, L_{PREV})} \qquad (36)$$

A span which is long relative to its neighbors is considered a flat because, a contour whose curvature is smoothly varying will result in a sequence of part program command points where the lengths of the spans changes gradually. If the long span were not interpreted as a line, the smooth curve, which passes through the span's end-points, could deviate substantially from the linear chord. This could adversely affect accuracy and surface finish. Experimentation with a number of sample die/mold part programs has indicated that a reasonable value for maximum length ratio is 2.5 and this is used as the default value for modal.spline_max_length_ratio.

The cosine dot product can be designated by the span data item: span->nonmodal.cos_dot_prod, and is denoted using the shorthand CDP. The CDP for the curr span is the dot product of the prev span's end of span tangent vector with the direction cosines vector of the curr span's linear chord. The CDP is a measure of the change of direction between a unit direction vector associated with any given span and span->prv. The exact nature of these unit vectors will be discussed shortly.

In one embodiment, a CDP takes on a value ranging from −1.0 to 1.0. A signed CDP which falls below a specified threshold indicates the change in direction is "sharper" than desired. The CDP for a span is computed in the final step of spline span initialization. The CDP cannot be determined prior to this point because it is computed for only the three axes that make up the spline Cartesian system.

In an exemplary embodiment, the CDP is computed based on the Cartesian coordinate system of the span for which the CDP is being computed. If the span and its previous span do not share the same coordinate system, then the computed value for CDP will typically be meaningless. This is not a problem because the exemplary finite state machine that determines the span type does not use the CDP for a span if the previous span is not contained in the same coordinate system.

FIG. 17 indicates that a next or last span will not be initialized if it is not a spline mode span. The CDP's for these spans may be required by the process that selects the spline type for the current span. In these cases, the CDP's for these spans (next or last) are computed on the transition into the selecting interpolation mode state, as is indicated by the presence of the function set_cdp( ) as an action at two of the transitions in FIG. 17. In these cases, the CDP for the next or last span is computed using the Cartesian coordinate system (axis indexes) associated with the next->prv or last->prv spans respectively.

The spline stage state machine in FIG. 17 indicates that the cosine dot product may potentially be computed for the curr, next, and last spans as part of the process of completing the curr span. The equations for the cosine dot product of the curr, prev, and last spans are shown below. The notation indicates that, for $CDP_{CURR}$, the previous span's eos_tan_vec is dotted with the current span's sos_dir_cos. The result for $CDP_{CURR}$ is based on an end of span tangent vector that describes the unit tangent to the spline curve at the end of the prev span. The results for $CDP_{NEXT}$ and $CDP_{LAST}$ are based on direction cosine vectors that describe the span's linear chord. In order to avoid duplicating computations, in one embodiment, the CDP for the next or last span is only computed if the existing span's CDP has the initialization value of zero.

$$CDP_{CURR} = \hat{t}_{PREV\_EOS} \cdot \hat{c}_{CURR\_SOS}$$

$$CDP_{NEXT} = \hat{c}_{CURR\_EOS} \cdot \hat{c}_{NEXT\_SOS}$$

$$CDP_{LAST} = \hat{c}_{NEXT\_EOS} \cdot \hat{c}_{LAST\_SOS} \qquad (37)$$

The discussions in the next section on selection of spline type will indicate that the CDP can be used to determine many of the transitions from one spline type to another. In several circumstances in this embodiment, a span's value for cosine dot product is compared to the same span's (modal) value for cos_max_angle. This comparison determines whether the span is part of a smooth curve or a sharp corner.

In general, a case where the span's CDP is less than the span's (modal) cos_max_angle, the span types for the curr span and the previous span will have been re-assigned as linear and the next and the span before the previous span (i.e. prev->prv) will have been assigned as spline_to_line. Smooth motion is maintained by inserting a corner blend between the two linear spans. This is all accomplished using look ahead as previously completed spans should not be modified. Details of this process are described in the next section of this document.

The threshold that differentiates between a smooth curve and sharp corner is the span's modal data item: spline_max_angle. The threshold may be programmed in the G5.1 block using the J word.

In this embodiment, the type of span for the curr span is determined based on a number of properties of the curr, prev, next, and last spans. The process of selecting the span type is implemented as a finite state machine where the state is the span type of the curr span. The span type is either linear, circular (including helical), or one of the types of splines.

The state may transition from the type of the prev span to a new type for the curr span when a new curr span is made available to the spline stage and is awaiting completion. State transitions are based on parameters computed from the attributes of the four spans. The rules dictating the state transitions from one span type to another are designed to infer the type of geometry intended by the part program. Specifically, the rules infer when a sharp corner or flat surface is intended instead of a smooth curve. This allows the part programmer to easily and successfully implement spline interpolation by entering a G5.1 at the beginning of a part program.

In one embodiment, spline automatically selects the span type even when the part program involves smooth contours, sharp corners, and flat surfaces. The rules for selecting spline type will automatically detect the intention of the part program with regards to which type of feature is being described. The rules are also designed to ensure that the geometry of the path will be the same regardless of the direction in which the path is traversed. This can be important because many contouring applications use bi-directional machining, and consistency in the geometry independent of direction is often essential in maintaining the surface quality. The cosine dot product (CDP) and length ratio (LR) are two key factors in this decision making process.

The finite state machine in FIG. 19 describes the process of how the interpolation mode can be selected in this embodiment. The two main states represent the span's (nonmodal) interpolation type and are Spline and NonSpline. Within the NonSpline state are nested states for linear and circular motion where circular motion is a generalization that contains both circular and helical motion.

Within the Spline state are nested states: OpenEndedSpline, Between, ToNonSpline, and ToStop. Within the OpenEndedSpline state are nested states: FromNonSpline, Interior, and FromStop. The names of these states should be self explanatory as to the type of span. The OpenEndedSpline refers to a spline span that, given the available information, is part of a contiguous sequence of (nonmodal) spline spans and is likely to be followed by additional (nonmodal) spline spans. The FromNonSpline and ToNonSpline states are further broken down into states that depend on whether the adjacent non-spline span is linear or circular.

The Spline, OpenEndedSpline, ToNonSpline, and FromNonSpline abstract states contain transitions that arc performed upon entry of these states. These are transitions T10, T17, T20, T39, and T43 in FIG. 19. These transitions address situations that are treated equivalently for all the nested subclass states. The upon-entry transitions are executed when a new span transitions into a state with an upon-entry transition. The upon-entry transition is generally only carried out one time for a new span.

In one embodiment, the upon-entry transitions are executed in an order starting with the transitions associated with the most abstract generalization of the span type and working inward toward the more specific classes of span type. A span type state is considered entered every time it or one of its nested states is entered for the first time with a new span. For example, consider a case where the existing state of the FSM is Interior and a new span is also found to be of type Interior. In this case, the upon-entry transitions for the Interior state's abstract generalizations Spline and OpenEndedSpline are performed in the order stated.

The state machine is done executing when one of the concrete classes of spline type state, i.e., ToLine, ToCircle, ToStop, Between, Interior, FromStop, FromLine, or FromCircle is entered and all of the required upon-entry transitions have been performed. When execution is completed, control is returned to the spline stage FSM (FIG. 17) at which time the span is completed and the spline stage enters a state where it is waiting for a new spline span.

The transitions into, out-of, and within the NonSpline state do not occur within the spline stage state machine. For example, transitions to and between spans where the (nonmodal) interpolation type is non-spline occur without invocation of the spline stage state machine during a period of time where the FSM is waiting for a new spline_mode span. For this reason, the current state of the select interpolation mode FSM is not retained by the FSM function itself, but is instead extracted from span->prv (the previous span that which will have completed all stages of processing) data in a step performed just prior to running the state machine.

In FIG. 19, the symbol H inside a circle depicts a transition to a retained Historical state. The meaning of a transition to a retained state is best described by an example. If, for example, a new span transitions to a ToLine Span, an initial upon entry transition T12 is executed. If conditions are such that transition T13 occurs, the state returns to ToLine. At that point the upon entry transition T43 is executed. If conditions are such that transition T45 is executed, the state returns to the retained state of ToLine. At that point, all upon entry transitions have been exhausted, a concrete state has been reached and selection of spline type is complete. That is, the initial determination of spline type has been retained.

Examples of cases where the initial concrete state is not retained can also be constructed. As a second example, consider an initial transition along the path T7-T8-T50 to arrive at FromCircle. Upon arrival at From Circle, transition T10 is executed. If conditions are such that T13 is executed, then the retained state of FromCircle is entered and transition T17 is executed. If conditions are such that T19 is executed, then the FromCircle state is retained and T20 is executed. If upon execution of transitions following T24 and T26 are executed, then the initial concrete state is not retained and the spline is of type Between.

The transitions depicted in the exemplary embodiment of FIG. 19 are described below.

| Transition: | T1 |
|---|---|
| From: | Line |
| To: | Line |
| Stimulus: | New span AND span is a (nonmodal) linear interpolation move |
| Actions: | None |
| Description: | This transition is part of a span preparation (Span Prep) process outside of the scope of the spline stage state machine. |
| Transition: | T2 |
| From: | Circle |
| To: | Circle |
| Stimulus: | New span && span is a (nonmodal) circular interpolation move |
| Actions: | None |
| Description: | This transition is part of a Span Prep process outside of the scope of the spline stage state machine. Circle refers to a generalization that includes all types of circular and helical spans. |
| Transition: | T3 |
| From: | Line |
| To: | Circle |
| Stimulus: | New span && span is a nonmodal circular interpolation move |
| Actions: | None |
| Description: | This transition is part of a Span Prep process outside of the scope of the spline stage state machine. Circle refers to a generalization that includes all types of circular and helical spans. |
| Transition: | T4 |
| From: | Circle |
| To: | Line |
| Stimulus: | New span && span is a (nonmodal) linear interpolation move |
| Actions: | None |
| Description: | This transition is part of a Span Prep process outside of the scope of the spline stage state machine. Circle refers to a generalization that includes all types of circular and helical spans. |
| Transition: | T5 |
| From: | Conditional Transition Node 1 |

-continued

| To: | Line |
|---|---|
| Stimulus: | span is a (nonmodal) linear interpolation move |
| Actions: | None |
| Description: | This transition could take place either within the spline stage or elsewhere in Span Prep. |
| Transition: | T6 |
| From: | Conditional Transition Node 1 |
| To: | Circle |
| Stimulus: | span is a (nonmodal) circular interpolation move |
| Actions: | None |
| Description: | This transition could take place either within the spline stage or elsewhere in Span Prep. |
| Transition: | T7 |
| From: | NonSpline |
| To: | Conditional Transition Node 2 |
| Stimulus: | New span: i.e. spline stage is invoked for the first time with a new span awaiting completion. |
| Actions: | None |
| Description: | Begin transition toward a spline span. |
| Transition: | T8 |
| From: | Conditional Transition Node 2 |
| To: | FromNonSpline (node 17) |
| Stimulus: | Not T9, i.e. span is NOT the first span of a spline sequence |
| Actions: | None |
| Description: | Attempt a spline which transitions tangentially from a non-spline into a spline sequence. The testing initiated upon entry into FromNonSpline's parent states could cause the span to be re-assigned as a NonSpline Line. |
| Transition: | T9 |
| From: | Conditional Transition Node 2 |
| To: | FromStop (as a result of default transitions) |
| Stimulus: | Span is the first span of a new spline sequence, |
| Actions: | None |
| Description: | The current span is the first in a new sequence of spline spans. The span may be re-assigned as NonSpline:Line if the testing initiated upon entry of FromStop's parent states indicate that a spline sequence cannot be begun at this point. |
| Transition: | T10 |
| From: | Spline |
| To: | Conditional Transition Node 3 |
| Stimulus: | Upon entry of abstract state spline |
| Actions: | None |
| Description: | Initiate a set of tests to determine whether span should be reassigned as a (nonmodal) linear interpolation span and whether the span should be identified as the last of a spline sequence . . . |
| Transition: | T11 |
| From: | Conditional Transition Node 3 |
| To: | NonSpline |
| Stimulus: | span is NOT first span of a spline sequence AND previous span did not end in a full stop AND (span involves rotary axis motion OR previous span contains motion on a parallel axis outside of current spans Cartesian system) |
| Actions: | set span's nonmodal interpolation type as linear |
| Description: | The span is converted to linear in cases where the span involves rotary axis motion or is in a different spline coordinate system compared to the previous span, i.e. the previous span has one or more spline axis indexes which is different from the current span's corresponding spline axis index. If the previous span ended in a full stop, or this is the first span of a spline sequence, e.g. first span of a program, then the span is not converted to linear because a FromStop spline might be possible |
| Transition: | T12 |
| From: | Conditional Transition Node 3 |
| To: | Conditional Transition Node 4 |
| Stimulus: | Not T11 |
| Actions: | None |
| Description: | Move toward next condition. |
| Transition: | T13 |
| From: | Conditional Transition Node 4 |
| To: | Sub-State within Spline State prior to transition T10 |
| Stimulus: | Not T14: i.e., span is not last of a spline sequence and does not end in a full stop. |
| Actions: | None |

-continued

| | |
|---|---|
| Description: | This is the usual case where the spline span is in the same Cartesian coordinate system as the previous span and it does not end in a full stop. The state returns to the position it had prior to the upon-entry transition T10. |
| Transition: | T14 |
| From: | Conditional Transition Node 4 |
| To: | Conditional Transition Node 5 |
| Stimulus: | span is last of a sequence and/or ends in a full stop. The span can end in a full stop for many reasons. For example, a full stop could have been explicitly programmed, the span contains a wait for steady state requirement, is the last span of a program, etc. |
| Actions: | none |
| Description: | The stimulus conditions indicate that the span will end with a full stop to zero velocity and the span will be the final span of the spline sequence. |
| Transition: | T15 |
| From: | Conditional Transition Node 5 |
| To: | NonSpline |
| Stimulus: | Not T16: i.e. previous span was not spline OR previous span ended in a full stop |
| Actions: | set span's (nonmodal) interpolation type as linear |
| Description: | Cannot have a ToStop spline span if the previous span was not spline or if the previous span ended in a full stop. For these reasons linear interpolation is used. |
| Transition: | T16 |
| From: | Conditional Transition Node 5 |
| To: | ToStop |
| Stimulus: | Previous span was a nonmodal spline interpolation span AND previous span does NOT end with a full stop. |
| Actions: | None |
| Description: | End the spline sequence with a spline to a stop. |
| Transition: | T17 |
| From: | OpenEndedSpline |
| To: | Conditional Transition Node 6 |
| Stimulus: | Upon entry of abstract state OpenEndedSpline. |
| Actions: | None |
| Description: | Initiate a check on whether the span should end in a corner and/or whether the next span should represent a flat. |
| Transition: | T18 |
| From: | Conditional Transition Node 6 |
| To: | NonSpline |
| Stimulus: | Not T19: i.e. the angle of change of direction between the current span and the next span is sharper than the threshold |
| Actions: | set span's (nonmodal) interpolation type as linear. If next is a nonmodal spline span, convert it to a nonmodal linear span to allow for a corner blend to be inserted between the two linear spans in a later (corner blending) stage |
| Description: | The geometry is not well suited to an OpenEndedSpline or a Between spline. The span is assigned as linear because the corner is too sharp. |
| Transition: | T19 |
| From: | Conditional Transition Node 6 |
| To: | Sub-state within OpenEndedSpline prior to transition T17 |
| Stimulus: | The angle of change of direction between the current span and the next span is below the maximum angle threshold |
| Actions: | A series of checks are performed based on the next and last spans' length ratios. If next is a spline move span, the next length ratio is unacceptably large, and the next span is longer than the current span, then the next span is re-assigned as a nonmodal linear axis move. If the next and last spans are both splines, and the last length ratio is unacceptably large, then the larger of the next or last span is re-assigned as a linear axis move. |
| Description: | The geometry is well suited to an OpenEndedSpline or a Between spline. The state returns to the position it had prior to the upon-entry transition T17. The next and last spans are potentially converted to linear based on the length ratios. |
| Transition: | T20 |
| From: | FromNonSpline |
| To: | Conditional Transition Node 7 |
| Stimulus: | Upon entry of abstract state FromNonSpline. |
| Actions: | None |
| Description: | Initiate a series of checks to determine whether a smooth transition from a non-spline span to a spline span is a reasonable action. |
| Transition: | T21 |
| From: | Conditional Transition Node 7 |
| To: | NonSpline |
| Stimulus: | (rotary axis motion detected in prev span) OR angle change between previous span's end of span direction and curr span's linear chord is greater than the maximum angle threshold. |
| Actions: | set span's (nonmodal) interpolation type as linear |
| Description: | A FromNonSpline spline span cannot perform a smooth transition from a non-spline span if the non-spline span involved rotary axis motion or if the direction change at the transition is too large. |
| Transition: | T22 |
| From: | Conditional Transition Node 7 |
| To: | Conditional Transition Node 8 |
| Stimulus: | Not T21: i.e., no rotary motion on previous span AND end of span unit tangent vector for previous non-spline does not deviate largely from the direction cosines vector of the curr span's linear chord. |
| Actions: | None |
| Description: | A transition from a non-spline into a contiguous sequence of spline spans should be possible as long as the next span is a spline_axis_move. |
| Transition: | T23 |
| From: | Conditional Transition Node 8 |
| To: | FromNonSpline |
| Stimulus: | Not T24: i.e. next is a spline span |
| Actions: | None |
| Description: | All conditions for a transition from a non-spline into a contiguous sequence of spline spans have been met. |
| Transition: | T24 |
| From: | Conditional Transition Node 8 |
| To: | Conditional Transition Node 9 |
| Stimulus: | next span's nonmodal interpolation type is NOT spline |
| Actions: | compute the quantity: between_cdp (the dot product of the previous span's end of span direction cosines vector and the next span's start of span direction cosines vector) |
| Description: | A transition from a non-spline is not possible because the next span is not a spline. Transition state into a test for determining whether a Between spline is reasonable. |
| Transition: | T25 |
| From: | Conditional Transition Node 9 |
| To: | NonSpline |
| Stimulus: | Not T26: i.e., geometry is inappropriate for a Between Spline |
| Actions: | change curr span's nonmodal interpolation type to linear; |
| Description: | A Between spline is inappropriate because the geometric conditions are not good for parameterizing the Between spline according to distance along the path: use a linear span. |
| Transition: | T26 |
| From: | Conditional Transition Node 9 |
| To: | Between |
| Stimulus: | between_cdp > min_between_cdp |
| Actions: | None |
| Description: | The change in direction between the two non-spline spans on either side of the spline span is acceptably small, so the BetweenSpline is used. The between_cdp is a quantity that is computed to determine whether decent path length parameterization of the Between spline is possible. |
| Transition: | T27 |
| From: | Between |
| To: | NonSpline |
| Stimulus: | New Span: i.e. spline stage is invoked for the first time with a new span awaiting completion. |
| Actions: | None |
| Description: | A Between spline always transitions to a non-spline. This transition occurs outside of the scope of the spline stage state machine. |
| Transition: | T28 |
| From: | ToStop |
| To: | FromStop |
| Stimulus: | New Span: i.e. spline stage is invoked for the first time with a new span awaiting completion. |
| Actions: | None |
| Description: | The spline following a ToStop is naturally a FromStop. Evaluation of the conditions following the upon-entry transitions for FromStop's abstract generalizations could result in reassigning span as a NonSpline linear span. |
| Transition: | T29 |
| From: | ToStop |
| To: | NonSpline |

-continued

| | |
|---|---|
| Stimulus: | New span is non-spline, i.e., spline stage is not invoked for span following the curr span. |
| Actions: | None |
| Description: | This transition occurs elsewhere in Span Prep outside of the scope of the spline stage state machine. |
| Transition: | T30 |
| From: | FromNonSpline |
| To: | Interior |
| Stimulus: | New span, i.e., spline stage is invoked for the first time with a new span awaiting completion. |
| Actions: | None |
| Description: | A FromNonSpline spline span always initially transitions directly to an InteriorSpline. This may change due to the conditions imposed following the upon-entry transitions for the parent states. |
| Transition: | T31 |
| From: | FromStop |
| To: | Interior |
| Stimulus: | New span, i.e., spline stage is invoked for the first time with a new span awaiting completion. |
| Actions: | None |
| Description: | A spline span following a FromStop spline always initially transitions to an Interior spline. This may change to Linear or ToStop due to the conditions imposed following the upon entry transitions of FromStop's parent states. |
| Transition: | T32 |
| From: | Interior |
| To: | Conditional Transition Node 10 |
| Stimulus: | New span, i.e., spline stage is invoked for the first time with a new span awaiting completion. |
| Actions: | None |
| Description: | A spline span that follows an interior spline will either be a new interior spline or a ToNonSpline span. A series of conditional transitions is used to determine the initial spline type. |
| Transition: | T33 |
| From: | Conditional Transition Node 10 |
| To: | Conditional Transition Node 11 |
| Stimulus: | next span's nonmodal interpolation type is spline |
| Actions: | None |
| Description: | Move toward next conditional transition |
| Transition: | T34 |
| From: | Conditional Transition Node 10 |
| To: | ToNonSpline (Conditional Transition Node 16) |
| Stimulus: | Not T33, i.e., next span is not a spline nonmodal interpolation type |
| Actions: | None |
| Description: | If next span is not a spline span, then the current span should be a transition to a non-spline. |
| Transition: | T35 |
| From: | Conditional Transition Node 11 |
| To: | Interior |
| Stimulus: | Next span is the final span of a spline sequence, i.e.: next span ends in a full stop, next span is last span of a program, last span (span following next) is not available, last span contains no motion, etc. |
| Actions: | None |
| Description: | Current span will be an interior span if the geometry permits (if the upon entry transitions for interior and its parent states result in the state returning interior). Next span will be a ToStop if the geometry permits or a linear span otherwise. |
| Transition: | T36 |
| From: | Conditional Transition Node 11 |
| To: | Conditional Transition Node 12 |
| Stimulus: | Not T35, i.e. next span is NOT the final span of a spline sequence. |
| Actions: | None |
| Description: | Move toward next conditional transition. |
| Transition: | T37 |
| From: | Conditional Transition Node 12 |
| To: | Interior |
| Stimulus: | the last span's CDP indicates that the angle between the next span and the last span involves a direction change that is within than the allowable maximum angle threshold |
| Actions: | None |
| Description: | Since the direction change angle between next and last is acceptably small, it is expected that the next span will be a spline span, thus, the current span will be of the type Interior. |
| Transition: | T38 |
| From: | Conditional Transition Node 12 |
| To: | ToLine |
| Stimulus: | Not T37, i.e. next span ends in a sharp corner |
| Actions: | set the next span's nonmodal interpolation type as linear |
| Description: | When the next span ends in a sharp corner, then the next and last spans should be non-spline and the current span should be a ToLine. This case applies regardless of whether last span is spline, linear, or circular. The next span is always a spline_mode span when the FSM is at conditional transition node 12. The transition does not contain any actions for explicitly defining the last span as some type of non-spline. If last is explicitly non-spline, then it need not be redefined. If last is a nonmodal.spline_axis_move, it will be redefined as linear when it is the next span the next time the spline stage is invoked with a new span awaiting completion |
| Transition: | T39 |
| From: | Interior |
| To: | Conditional Transition Node 18 |
| Stimulus: | Upon Entry of State Interior |
| Actions: | none |
| Description: | The sequence of transitions begun upon entry of the state interior allows a FromStop or FromNonSpline type span to be followed by a ToNonSpline type of span. |
| Transition: | T40 |
| From: | Conditional Transition Node 18 |
| To: | Interior |
| Stimulus: | Next span is a nonmodal spline axis move span. |
| Actions: | none |
| Description: | An Interior spline is appropriate because the next span is also a spline span. |
| Transition: | T41 |
| From: | Conditional Transition Node 18 |
| To: | ToNonSpline |
| Stimulus: | Next span's nonmodal interpolation type is NOT spline |
| Actions: | none |
| Description: | An Interior spline is NOT appropriate because the next span is a non-spline span. If an interior spline were used, then the transition between the spline span and non-spline span would have involved unequal tangent vectors at the span boundary. |
| Transition: | T43 |
| From: | ToNonSpline |
| To: | Conditional Transition Node 15 |
| Stimulus: | Upon entry of abstract state ToNonSpline |
| Actions: | None |
| Description: | Initiate a check to ensure that the geometry is suited for a smooth transition spline to non-spline. |
| Transition: | T44 |
| From: | Conditional Transition Node 15 |
| To: | ToStop |
| Stimulus: | The change in direction angle between the current and next span is greater than the maximum angle threshold. |
| Actions: | indicate that the curr span should end in a full stop (i.e. zero velocity) |
| Description: | The change in direction between the direction cosines vector of the current span's linear chord and the start of span direction cosines vector of the next non-spline span is too large to accommodate a ToNonSpline span. A ToStop span, which ignores the next linear span, is used instead. |
| Transition: | T45 |
| From: | Conditional Transition Node 15 |
| To: | ToNonSpline |
| Stimulus: | Not T44, i.e., the change in direction between the current span's linear chord and the next span's start of span direction is acceptably small. |
| Actions: | None |
| Description: | The moderate change in direction allows for execution of the ToNonSpline span. |
| Transition: | T46 |
| From: | ToNonSpline |
| To: | NonSpline |
| Stimulus: | A new non-spline span is prepared for completion. |
| Actions: | None |

-continued

| | |
|---|---|
| Description: | This transition takes place automatically outside of the scope of the spline stage state machine during a period of time while the spline stage state machine is in the state: "waiting for a new spline mode span." |
| Transition: | T47 |
| From: | Conditional Transition Node 16 |
| To: | ToLine |
| Stimulus: | span's nonmodal interpolation type is linear |
| Actions: | None |
| Description: | The nonmodal interpolation type will have been set to linear if it were explicitly programmed as linear or if the span was reassigned to linear at some point within the select interpolation mode FSM during completion of the curr or prev span. |
| Transition: | T48 |
| From: | Conditional Transition Node 16 |
| To: | ToCircle |
| Stimulus: | curr span's nonmodal interpolation type is circular or helical |
| Actions: | None |
| Description: | The nonmodal interpolation type is circular when the span was explicitly programmed as circular or when a blend radius had been inserted in an earlier stage. The present implementation of spline handles the cases of ToLine and ToCircle in an identical way. There are two states and two spline types to account for the possibility of future enhancements where transitions from spline to circular are treated differently than transitions from spline to linear spans. |
| Transition: | T49 |
| From: | Conditional Transition Node 17 |
| To: | FromLine |
| Stimulus: | Previous span's (i.e. prev's) nonmodal interpolation type is linear |
| Actions: | None |
| Description: | The curr span will be a spline that smoothly transitions from a linear span into a sequence of spline spans. |
| Transition: | T50 |
| From: | Conditional Transition Node 17 |
| To: | FromCircle |
| Stimulus: | Previous span's (i.e. prev's) nonmodal interpolation type is circular or helical |
| Actions: | None |
| Description: | The curr span will be a spline that smoothly transitions from a circular span into a sequence of spline spans. |

FIGS. 20a, 20b, 20c, and 20d are graphs illustrating exemplary benefits that can be achieved according to one or more of the spline interpolation embodiments of the present invention. These graphs are created by controlling movement through two ellipses, the first ellipse being defined by 52 points in the part program, the second ellipse being defined by 158 points in the part program. As can be understood by comparing the FIG. 20a with FIG. 20b for Ellipse 1, using the spline interpolation embodiment provides much smoother X and Y axis velocity profiles than are obtained by using the linear interpolation method.

Figure 20A:
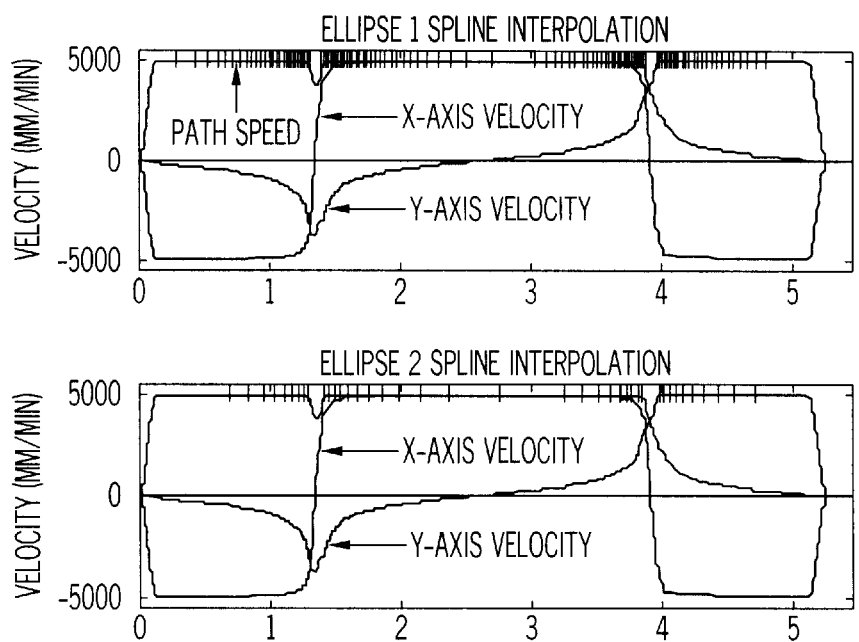
FIGS. 20a, 20b, 20c, 20d, illustrate how axis velocities and axis accelerations can be made more smooth and how feedrate limiting can be achieved more precisely using principles and embodiments of the present invention.
Figure 20B:
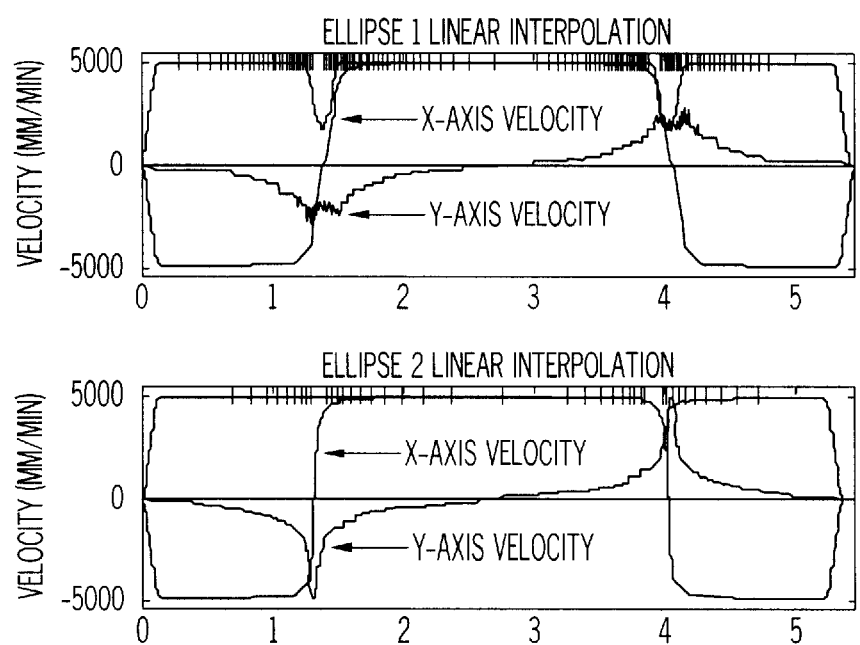

While, as shown in FIG. 20b, the linear interpolation profiles for Ellipse 2 are smoother than those for Ellipse 1, this is because the part program is provided with many more points for this program. In contrast, the spline interpolation profiles of FIG. 20a are better than the profiles of FIG. 20b, for both ellipses. Moreover, as shown in FIG. 20a, the spline interpolation system and method obtains substantially smooth profiles whether few points are provided (Ellipse 1) or many points are provided (Ellipse 2). Thus, the spline interpolation method can provide good results without requiring the time and memory of a large part program.

Another central benefit of the embodiment described herein may be observed by comparing the Path Speed traces in FIGS. 20a and 20b. Both path speed traces in 20a for the cases that utilize spline interpolation involve identical slowdowns at the point of maximum curvature on the ellipse (this happens to be the point where the X-axis reverses direction). These slowdowns are executed to ensure that the X-axis maximum acceleration (e.g., of 2000 mm/sec$^2$) is not exceeded. This is seen in FIG. 20d where the X-axis acceleration momentarily approaches its maximum value of 2000 mm/sec$^2$ at the location of the X-axis reversal.

The maximum velocity for each span involved in the slowdown is determined using the computed max_curv constraint vector as described in the description of the exemplary embodiments. The consistency of the path speed profile independent of the exact number and location of programmed end points used to approximate the curve is an advantage provided by at least one aspect of the spline interpolation system and method described above. The path speed profile is optimal in that it delivers the programmed feedrate wherever possible and slows the path speed the minimal amount required to meet the axes' acceleration constraints.

In contrast, the path speed versus time profiles in FIG. 20b indicate that when the curve is interpolated along a series of linear spans (using linear interpolation) the path speed constraints do depend on the number and location of the programmed end points. Specifically, for the example shown here, the path speed slows down more than is necessary for Ellipse 1 with fewer points and causes the total time to traverse the contour to be increased. The path speed for Ellipse2 does not slow down when needed and the average axis acceleration near the area of maximum curvature will exceed the capabilities of the axis.

Figure 20C:
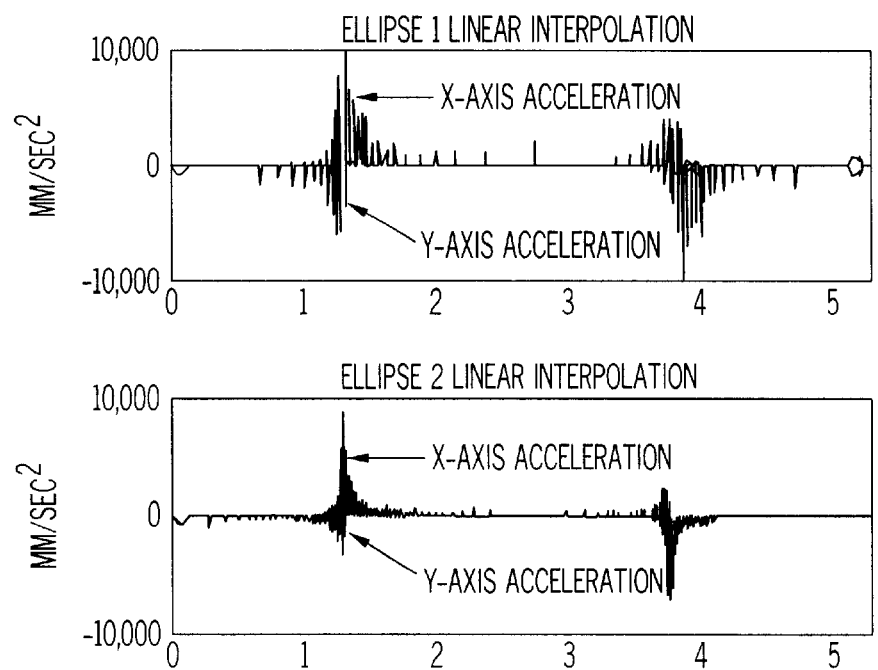
Figure 20D:
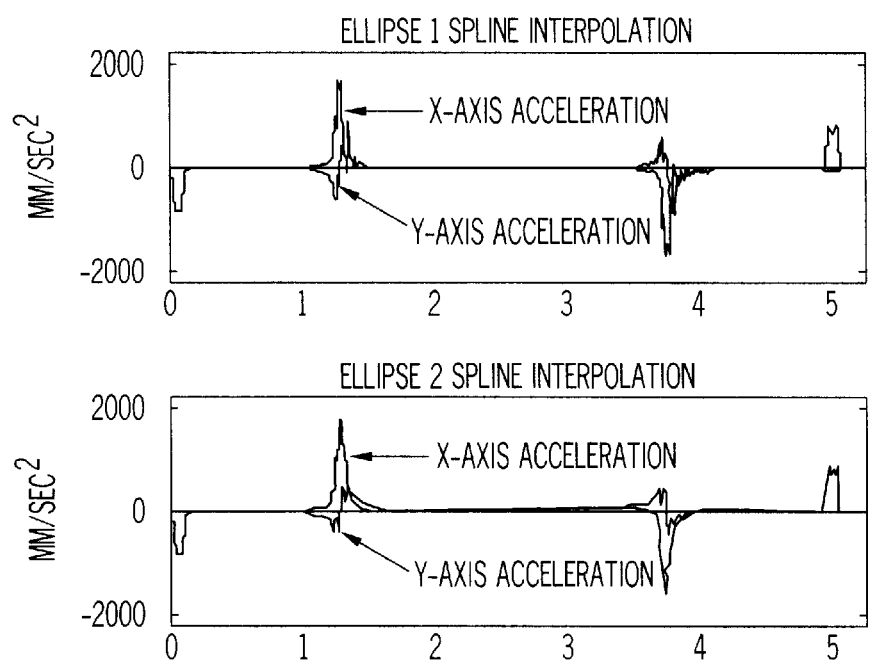

As shown by examining FIG. 20d, the smoother spline interpolation velocity profiles of FIG. 20a result in nearly continuous acceleration for either of the ellipses and the axis accelerations do not exceed their maximum allowable levels of 2000. In contrast, the linear interpolation method results in an undesirable series of impulses in acceleration for both ellipse types, as shown in FIG. 20C. Furthermore, the amplitude of the acceleration impulses far exceeds the maximum allowable acceleration levels for the axes. As noted above, in the machine tool context, high amplitude axis acceleration impulses can result in reduced quality of surface finish, accuracy errors on the finished workpiece, undesirable machine vibrations and resonances, greater following error, and/or jerky motion.

As discussed above, other features of these embodiments include the ability to automatically transition smoothly between spline sections of the path and linear or circular sections of the path, the ability to automatically maintain intended sharp corners in a part program path, the ability to automatically maintain intended flat portions of a part program path, the ability to enable imposition of precise feedrate constraints based on configured maximum axis accelerations and jerks, the ability to prevent axes from exceeding their capability, the ability to reduce or eliminate parameter tweaking, and/or the ability to reduce machining time.

While very detailed equations and potential implementations of a spline interpolation method and apparatus for a motion control system have been presented above, these examples should not be considered limiting in nature. These exemplary embodiments are shown and described simply for the purposes of illustrating potential ways to make and use the invention, including a best mode contemplated for carrying out the invention. As will be realized, the invention is capable of other different aspects and embodiments without departing from the scope of the invention.

For example, while the embodiment described makes automatic determinations of whether to use spline interpolation for each span by analyzing spans in an existing part program one at a time for length and/or angle characteristics, it may be possible to analyze several spans simultaneously, such as by comparing characteristics of various groups of spans in the part program. Moreover, while a third order polynomial can be used for forming the spline spans described above, it is contemplated that other polynomials of higher order could be utilized. Other mathematical functions parameterized against path distance may also be used, examples of such functions are the trigonometric functions (sine, cosine, tangent, secant, . . . ) rational functions such as the ratio of two polynomials, exponential functions, and the like. Also a combination of two or more spline polynomials could be utilized for each span.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that the scope of the invention be defined by the claims appended hereto.

What is claimed is:

1. A method of controlling motion of a movable machine member, the method comprising:

receiving a plurality of points which define a desired linear path, sharp corner, or contoured path while maintaining the desired path for the movable member, the plurality of points defining a plurality of spans on the desired path;

calculating a length of a first span in the plurality of spans;

determining the relative length of the first span with respect to at least one other span in the plurality of spans;

based upon the relative length, deciding whether the first span should be interpolated linearly or whether the first span should be interpolated using a spline function if the span is a contoured path;

if the first span should be interpolated using a spline function, deriving a spline interpolation equation for the first span, wherein the spline interpolation equation comprises a polynomial of at least the third order; and moving the movable member according to the spline interpolation function.

2. The method as recited in claim 1, wherein the plurality of points are received from a part program for a numerically controlled machine tool, and wherein the method further comprises:

programming a spline interpolation command in the part program.

3. The method as recited in claim 1, wherein the step of determining relative length comprises the steps of:

calculating a length of a second span in the plurality of spans; and determining a length ratio from the lengths of the first and second spans.

4. The method as recited in claim 3, wherein the deciding step comprises:

comparing the length ratio to a length ratio threshold, wherein the first span is to be interpolated using a spline function if the length ratio threshold is not exceeded.

5. The method as recited in claim 3, wherein step of determining length ratio comprises the step of:

dividing the lengths of the first and second spans.

6. The method as recited in claim 1, wherein the deriving step comprises the steps of:

selecting a spline type for the first span based upon characteristics of spans adjacent to the first span;

based upon the spline type, determining constraints for the spline interpolation equation; and using the constraints, calculating coefficients for the spline interpolation equation.

7. The method as recited in claim 1, wherein the spline interpolation equation is a function of the distance along the spline.

8. A method of controlling motion of a movable machine member, the method comprising:

receiving a plurality of points which define a desired linear path, sharp corner, or contoured path while maintaining the desired path for the movable member, the plurality of points defining a plurality of spans on the desired path;

determining a change in direction between a first span and a second span in the plurality of spans, wherein the first and second spans are consecutive spans;

comparing the change in direction to a threshold;

based upon the comparison, deciding whether the first span should be interpolated using a spline function;

if the first span should be interpolated using a spline function, deriving a spline interpolation equation for the first span, wherein the spline interpolation equation comprises a polynomial of at least the third order; and moving the movable member according to the spline interpolation equation.

9. The method as recited in claim 8, wherein the step of determining change in direction comprises the steps of:

calculating a cosine dot product for the first and second spans.

10. The method as recited in claim 9, wherein the step of determining cosine dot product comprises the step of:

calculating the dot product of the second span's end of span tangent vector and the first span's direction cosine vector.

11. The method as recited in claim 8, wherein the first span is to be interpolated using a spline function if the change in direction exceeds the threshold.

12. The method as recited in claim 8, wherein the deriving step comprises:

selecting a spline type for the first span based upon characteristics of the spans adjacent to the first span;

based upon the spline type, determining constraints for the spline interpolation equation; and using the constraints, calculating coefficients for the spline interpolation equation.

13. A method of controlling motion of a movable machine member, the method comprising:

providing a program having a plurality of points which define a desired linear path, sharp corner, or contoured path while maintaining the desired path for the movable member, wherein the program contains no spline interpolation commands, and wherein the program commands a curved section on the path by a series of short spans;

indicating that the curved section should be interpolated using splines, without providing any additional points on the desired path;

determining where the curved section is located in the program;

using the points in the program, calculating a spline interpolation equation for the curved section; and moving the movable member according to the spline interpolation equation.

14. The method as recited in claim 13, wherein the program comprises a part program for a numerically controlled machine tool.

15. The method as recited in claim 13, wherein the indicating step comprises:
   adding a spline interpolation command to the part program, without providing any additional points on the desired path.

16. The method as recited in claim 13, wherein the step of determining the curved section location is based upon the relative length of spans in the program.

17. The method as recited in claim 13, wherein the step of calculating a spline interpolation equation comprises the steps of:
   selecting a spline type for a first span in the curved section based upon characteristics of spans adjacent to the first span;
   based upon the spline type, determining constraints for the spline interpolation equation;
   estimating a length of the spline equation across the first span;
   using the constraints and the estimated length, calculating coefficients for the spline interpolation equation.

18. The method as recited in claim 17, wherein the estimating step comprises:
   fitting a parabola through three points in the program, wherein two of the points define the first span, and the third point is adjacent to the two points.

19. The method as recited in claim 13, wherein the spline interpolation equation is parameterized in terms of distance along the path.

20. A method of controlling motion of a movable machine member, the method comprising:
   receiving a plurality of points which define a desired linear path, sharp corner, or contoured path while maintaining the desired path for the movable member, the plurality of points defining a plurality of spans on the desired path;
   deciding whether a current span in the program should be interpolated using a spline interpolation function;
   if the current span is to be interpolated using a spline interpolation function, selecting a spline type for the current span from a plurality of spline types based upon characteristics of spans adjacent to the current span;
   based upon the spline type, determining constraints for the spline interpolation function, wherein the constraints determine the transition between the previous span and the current span and the transition between the current span and the next span;
   using the constraints, determining a spline interpolation for the current span; and
   moving the movable member according to the spline interpolation equation.

21. The method as recited in claim 20, wherein constraints cause the transition between the previous span and the next span to include continuity in direction, and wherein the constraints cause the transition between the current span and the next span to include continuity in direction.

22. The method as recited in claim 20, wherein the constraints comprise position constraints and direction constraints.

23. The method as recited in claim 22, wherein the direction constraints comprise a starting direction constraint and an ending direction constraint.

24. The method as recited in claim 20, wherein the plurality of spline types comprise a spline type to transition to a stop, a spline type to transition from a stop, and a spline type to transition from a line.

25. The method as recited in claim 20, further comprising:
   estimating a length for the current span, wherein the equation is determined using the estimate.

26. The method as recited in claim 25, wherein the estimating step comprises:
   fitting a parabola through two points which define the current span.

27. A system for controlling the motion of a movable member, comprising: a movable member;
   an actuator coupled to the movable member;
   a memory unit containing a plurality of points which define a desired linear path, sharp corner, or contoured path while maintaining the desired path for the movable member, the plurality of points defining a plurality of spans on the desired path; the plurality of points defining a plurality of spans on the desired path;
   a spline function calculator in communication with the memory unit, using a spline function based upon the length of the spans, wherein the spline function calculator is configured to choose which of the plurality of spans should be interpolated using a spline function based upon the length of the spans and to calculate a spline interpolation function for the chosen spans;
   a position command interpolator in communication with the spline function calculator and configured to interpolate position commands from the spline interpolation function for control of the actuator.

28. The system as recited in claim 27, further comprising:
   a servocontroller configured to supply power signals to the actuator based upon the interpolated position commands; and
   a feedback sensor in communication with the actuator and the servocontroller.

29. The system as recited in claim 27, wherein the spline function calculator is further configured to choose which of the plurality of spans should be interpolated using a spline function based upon a change in direction between two consecutive spans.

30. The system as recited in claim 27, wherein the spline function calculator is further configured to select a spline type from a plurality of spline types for each of the chosen spans.

31. The system as recited in claim 27, wherein the actuator comprises an electric motor and the movable member comprises a mechanical member of a machine tool.

32. The method as recited in claim 1, further comprising:
   calculating a maximum tangent vector;
   using the maximum tangent vector, calculating a maximum velocity for the first span;
   using the maximum tangent vector, calculating a maximum acceleration for the first span; and
   using the maximum tangent vector, calculating a maximum jerk for the first span.

33. The method as recited in claim 1, further comprising:
   calculating a maximum curvature vector;
   using the maximum curvature vector to limit the maximum velocity for the first span.

34. The method as recited in claim 1, further comprising:
   calculating an end of span speed constraint for the first span.

* * * * *